United States Patent
Inokuchi et al.

(10) Patent No.: US 6,621,779 B1
(45) Date of Patent: Sep. 16, 2003

(54) LASER POWER CONTROLLER AND OPTICAL DISK DEVICE

(75) Inventors: Chikashi Inokuchi, Osaka (JP); Shigeru Furumiya, Hyogo (JP); Yoshiyuki Miyabata, Kyoto (JP); Yuji Hisakado, Osaka (JP); Atsushi Miyazaki, Kyoto (JP); Toshiya Akagi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/763,277

(22) PCT Filed: Aug. 20, 1999

(86) PCT No.: PCT/JP99/04506
§ 371 (c)(1),
(2), (4) Date: May 11, 2001

(87) PCT Pub. No.: WO00/11668
PCT Pub. Date: Mar. 2, 2000

(30) Foreign Application Priority Data

Dec. 22, 1998 (JP) .......................... 10-364551
Aug. 20, 1998 (JP) .......................... 10-233942

(51) Int. Cl.[7] .................................. B11B 7/00
(52) U.S. Cl. ..................... 369/47.51; 369/44.26; 369/116
(58) Field of Search ............... 369/44.26, 44.34, 369/44.13, 47.5, 47.51, 116, 53.26, 53.27, 53.2, 53.23, 275.3, 275.4

(56) References Cited

U.S. PATENT DOCUMENTS

| | | | | |
|---|---|---|---|---|
| 5,550,799 A | * | 8/1996 | Inoue et al. | 369/116 |
| 6,172,952 B1 | * | 1/2001 | Inokuchi et al. | 369/47.55 |
| 6,192,009 B1 | * | 2/2001 | Kim | 369/44.26 |
| 6,487,149 B1 | * | 11/2002 | Yokoi et al. | 367/47.51 |

FOREIGN PATENT DOCUMENTS

| | | | | |
|---|---|---|---|---|
| JP | 06251377 A | * | 9/1994 |
| JP | 08030987 A | * | 2/1996 |
| JP | 08167149 A | * | 6/1996 |
| JP | 09115138 A | * | 5/1997 |
| JP | 09171632 A | * | 6/1997 |
| JP | 09231569 A | * | 9/1997 |
| JP | 09270129 A | * | 10/1997 |

* cited by examiner

Primary Examiner—Thang V. Tran
(74) Attorney, Agent, or Firm—Snell & Wilmer, LLP

(57) ABSTRACT

A power control device for controlling a power of a light source of an optical beam directed to an optical medium. The power control device includes a reflected light detector for detecting reflected light from the optical medium when irradiated by an optical beam which is following a track; an arithmetic unit for calculating from the reflected light a transmissivity of light transmitted from a disk surface to a recording layer or an amount of directed light on the recording layer of the medium; and power control means for controlling the power of the light source for emission based on a calculation result produced by the arithmetic unit.

3 Claims, 16 Drawing Sheets

LASER POWER CONTROLLER AND OPTICAL DISK DEVICE

TECHNICAL FIELD

The present invention relates to a laser power control device which is used for recording/reproduction of digital disks and to an optical disk apparatus which uses the laser power control device, and relates to a laser power control device for controlling a laser power and an optical disk apparatus which uses the laser power control device.

BACKGROUND ART

In a recordable/reproducible DVD-RAM disk, the inside of the disk is divided into a plurality of zones. The number of rotations is constant within each zone, but is different between different zones. In general, such a system is called a zone CLV. Each zone is divided into a plurality of sectors, and each sector is formed by a data recording region in which information can be recorded and an address region in which the address of the sector has been previously recorded. Another feature of this system is that the data recording region can extend over both a guiding groove region of the disk (hereinafter, referred to as "groove") and a region between the guiding groove regions (hereinafter, referred to as "land"). Address information is recorded in address portions so that a pair of address portions are offset from each other and each address portion extends over the groove and the land.

In order to smoothly perform reproduction in the data recording region based on the above special format, a single wave corresponding to a divisional component of a clock component (hereinafter, referred to as a "wobble") is formed in an address region and a data recording region while cutting a disk. When reproducing from the disk, the wave component is detected as a tracking error signal.

Hereinafter, a conventional optical disk recording/reproduction device will be described.

FIG. 11 is a block diagram of a conventional optical disk recording/reproducing device 700. In FIG. 11, reference numeral 1 denotes a motor; reference numeral 2 denotes an optical disk; reference numeral 3 denotes an optical head; reference numeral 4 denotes a reproduction signal/servo signal detection circuit for generating a reproduction signal, a focus error signal, and a tracking error signal from an output signal obtained from the optical head 3; reference numeral 5 denotes focus/tracking control means for controlling the optical head 3 by using a servo signal from the reproduction signal/servo signal detection circuit 4 and for controlling the motor 2; reference numeral 6 denotes a reproduction signal binarizing circuit for binarizing the reproduction signal; reference numeral 7 denotes a demodulator for demodulating the binarized reproduction signal to generate reproduction data; reference numeral 8 denotes a laser driving circuit for driving a laser which is a light source of the optical head 3; reference numeral 9 denotes a recording signal generation circuit for generating a signal for modulating laser light by the laser driving circuit based on the data obtained after modulation; reference numeral 10 denotes a modulator for modulating data to be recorded so as to generate a signal which is supplied to the recording signal generation circuit 9; reference numeral 11 denotes power control means for controlling the laser power during recording/reproduction of data; reference numeral 12 denotes a gate signal generator for generating various gate signals based on a clock of a reference clock generator 14; reference numeral 13 denotes an error correction/address detection device for detecting and correcting the error amount of the reproduction data demodulated by the demodulator 7 and for detecting an address in the same data sequence; reference numeral 14 denotes the reference clock generator for generating a reference clock for recording/reproduction of data; reference numeral 15 denotes a CPU which gives the error correction/address detection circuit a command to measure a BER (Bit Error Rate), which can set the power in the recording power setting means, and which manages a user interface.

Hereinafter, an operation of the optical disk recording/reproduction device 700 having the above structure will be described.

An output signal read out from the optical disk 2 by the optical head 3 is supplied to subsequent process circuits as a reproduction signal, a focus error signal, and a tracking error signal by the reproduction signal/servo signal detection circuit 4. The focus error signal and the tracking error signal are supplied to the focus/tracking control means 5. The optical head 3 is controlled by the focus/tracking control means 5 so as to follow the wavering of the disk surface and decentration of the disk. The reproduction signal is supplied to the reproduction signal binarizing circuit 6, and the binarized data sequence and a read clock which is in synchronization with the data are output to the demodulator 7. The reference clock generator 14 generates a reference clock which is necessary for modulating/demodulating data to be recorded/reproduced by this apparatus.

The demodulator 7 performs modulation using the supplied binarized data sequence and the read clock according to a demodulation rule, and outputs the demodulated data to the error correction/address detection device 13 using the reference clock. The output reproduction data is supplied to the subsequent error correction/address detection device 13, and an address position on a track is detected by the detection device 13. An address detection signal is supplied to the gate signal generator 12, and the gate signal generator 12 uses this signal as a position reference on the track to generate, using the gate signal, a signal which is necessary during recording/reproduction.

Data to be recorded is converted by the modulator 10 into a data sequence to be recorded according to a modulation rule. The data sequence obtained by the conversion is further converted by the recording signal generation circuit 9 into a signal for modulating laser light, and this signal is supplied to the laser driving circuit 8. The laser driving circuit 8 modulates the laser light which is a light source of the optical head 3 for recording data on the disk. The recording is performed at a recording power predetermined by the CPU 15.

An operation of the optical disk recording/reproducing device having the above structure when recording is performed in a sector of a DVD-RAM disk is described with reference to FIG. 12. Each zone of the DVD-RAM disk is divided into a plurality of sectors, and each sector includes a data recording region in which information can be recorded and an address region in which an address of the sector has been recorded. In FIG. 12, a reproduction signal from the disk is shown in FIG. 12(a); a corresponding tracking error signal is shown in FIG. 12(b); a read gate signal, which is a representative gate signal necessary for reproduction of data/address, is shown in FIG. 12(c); a detection signal of the address is shown in FIG. 12(d); a recording gate signal, which is another representative gate signal necessary for recording is shown in FIG. 12(e); and an operation gate signal of the modulator is shown in FIG. 12(g).

A signal read out through the optical head 3 is output by the reproduction signal/servo signal detection circuit 4 as a reproduction signal shown in FIG. 12(a) and a tracking error signal shown in FIG. 12(b).

Assuming that the number of rotations of a disk in a zone N is equal to a target number of rotations, a read gate signal for reading an address of a target sector L is activated at timing (c)-2 in FIG. 12(c) using an address detection signal for a sector previous to the target sector L in which data is to be recorded as a reference.

The demodulator 7 performs demodulation based on data from the reproduction signal binarizing circuit 6 and the read clock, and reading of an address is performed in the error correction/address detection device 13. When the address has been normally read out, the detection device 13 generates a signal as shown in FIG. 12(d), and the gate signal generator 12 uses this signal as a reference to activate a recording gate signal and a modulator operation start signal at timings (e)-1 and (f)-1, respectively, for recording data. In response to the modulator operation start signal, the laser driving circuit 8 is placed into a recording state, and accordingly, the modulator operation start signal is activated, whereby the modulation of data is started, and the recording signal generation circuit 9 generates a recording signal.

Now, a method for determining the recording power is described. As described above, in an apparatus for recording data, the power used for recording is generally set through learning.

FIG. 13 is a flowchart showing an example of learning of the recording power. Herein, an example of learning in a DVD-RAM is described. In the optical disk apparatus, two types of learning, i.e., learning for a recording power Popt and learning for an erasing power Peopt, are performed for setting the recording power.

At the beginning of a learning process for the recording power (S101–S103), an interim erasing power Pe1 an d an interim recording power Pw1 are provided. The recording power Pw1 is set to a value sufficiently lower than an optimum recording power, and the erasing power Pe1 is set to a value in the vicinity of a value specified in the specification. The apparatus performs recording in any sector at the recording power Pw1 which is sufficiently lower than an optimum recording power and the erasing power Pe1 which is in the vicinity of a value specified in the specification, and measurement of the BER (S105).

Next, it is determined whether or not the measured BER is smaller than a threshold C1 (S106). Since the recording power Pw1 is a low power as described above, it is determined that the measured value is greater than the threshold C1 ("No" in S106). Next, the apparatus sets the recording power to a value which is equal to the recording power Pw1 plus a recording power increase Pws (S107), and performs recording (S104), and measures the BER (S105). The apparatus repeats this process and obtains a recording power Pw when the BER becomes smaller than the threshold C1. The product of the obtained recording power Pw and a multiplying factor Cw is used as an optimum recording power Pwopt (S108).

Next, the apparatus uses the optimum recording power Pwopt determined as described above so as to obtain an optimum erasing power Peopt. In the learning process for the erasing power, the apparatus performs recording at the erasing power Pe1 which is in the vicinity of a value specified in the specification (S109), and measurement of the BER (S110). Then, it is determined whether or not the BER exceeds a threshold C2 (S111).

When the BER does not exceed the threshold C2, the erasing power Pe1 is reduced by an erasing power decrease Pes (S112), and the steps S109 and S110 are repeated. During these steps, the erasing power Pe when the BER exceeds the threshold C2 is obtained.

The obtained erasing power Pe is stored as an erasing power variable PeL (S113). The erasing power Pe is reset to the erasing power Pe1. Then, the recording is performed at the erasing power Pe1 (S114). Next, the BER is measured (S115). Then, it is determined whether or not the BER exceeds the threshold C2 (S116). When the BER does not exceed the threshold C2, a predetermined value Pes is added to the erasing power Pe (S117). The erasing power Pe when the BER exceeds the threshold C2 is obtained. The central value of the erasing power Pe when the BER exceeds the threshold C2 and the previously obtained erasing power variable PeL is assigned as an optimum erasing power Peopt (S118).

The above process is merely an example of the learning for recording power. Alternatively, it is possible to learn the recording power by reproducing a recorded signal, detecting the amplitude thereto, and optimizing the value of the amplitude.

The above process is performed between the error correction/address detection device 13 and the power control means 11, whereby an optimum recording power is determined.

FIG. 14 is a diagram for illustrating recording by the apparatus on a disk whose optimum recording power is 10 mW. The recording is performed while the laser power is controlled so that the output of the object lens is 10 mW. In FIG. 14, in a portion on which a fingerprint is not attached, the transmissivity of a substrate layer is ideally 1, and accordingly, an effective recording power on a recording layer is 10 mW. As a result, optimum recording can be performed. However, as shown in the right side of FIG. 14, when a fingerprint, dust, or the like is attached on the substrate of the disk, the effective recording power on the recording layer is decreased according to the decrease in transmissivity due to the attachment. For example, when the transmissivity is decreased to 0.8, the recording power is decreased to 8 mW. As a result, optimum recording cannot be performed.

Next, reproduction of signal is described with reference to FIG. 15. The description is made with a reproduction signal appropriately recorded in the recording layer. In a portion on which a fingerprint or dust is attached, the transmissivity is 0.8, and the light amount decreases when the light reciprocates down and up through this portion. Assuming that the signal amplitude in a normal (clean) portion is 1, data in the dirty portion is reproduced at the following amplitude:

$$(0.8)^2 = 0.64$$

Thus, in a portion on which a fingerprint, dust, or the like is attached, lack of the light amount and variation in the amplitude of the reproduction signal are caused. As a result, the attachment on the disk surface causes errors even when reproducing is performed on a portion in which appropriate recording has been performed.

The apparatus performs recording of data at the recording power determined by the above-described method. However, control for data recording is the control achieved by keeping the amount of laser light constant. Thus, in the apparatus having the above structure, when a fingerprint, a scratch, or the like is present on the substrate of the disk, or when the optical head 3 is subjected to vibration, impact, or the like, introduced from outside, defocusing or off-tracking is caused, and accordingly, the effective recording power on a recording film is reduced, whereby recording may not be normally performed.

This malfunction is described with reference to FIG. 16. Since the recording operation is performed as described above, the description thereof is omitted. In a sector in which recording is to be performed, when dirt, such as a fingerprint or the like, is present on the substrate as shown by the slanted lines in FIG. 16, the effective recording power in that portion is reduced. At this time, when a wobble signal is observed, the signal amplitude thereof is decreased in a portion on which dirt, such as a fingerprint, is present. Typically, the recording power margin of a rewritable optical disk is 10% to 30%. If the light amount is decreased to be smaller than the reduced effective recording power, recording cannot be correctly performed on the disk. Observing the reproduction signal waveform after the recording, the amplitude of the reproduction signal after the recording is reduced in a portion on which dirt, such as a fingerprint, is present. As a result, it becomes difficult to correctly reproduce data.

In summary, in a conventional apparatus structure, in recording data onto a DVD-RAM, there is a problem that recording by the apparatus cannot be appropriately performed due to a defect or dirt on a substrate of a disk, such as a fingerprint, a scratch, etc, or due to defocusing caused by a vibration/impact outside the optical head.

DISCLOSURE OF INVENTION

A power control device according to the present invention for controlling a power of a light source of an optical beam directed to an optical medium, includes: a reflected light detector for detecting reflected light from the optical medium when irradiated by an optical beam which is following a track; an arithmetic unit for calculating from the reflected light a transmissivity of light transmitted from a disk surface to a recording layer or an amount of directed light on the recording layer of the medium; and power control means for controlling the power of the light source for emission based on a calculation result produced by the arithmetic unit, whereby the above object is achieved.

The optical medium may have a recording track which has been wobble-processed in a disk radius direction; the reflected light detector may extract the wobble signal component from a tracking error signal during recording; and the power control means may control laser power so as to keep an amplitude value of the wobble signal component substantially constant.

The reflected light detector may detect an amplitude of the wobble signal component from a tracking error signal obtained when the optical beam follows the track; the arithmetic unit may use the amplitude value of the wobble signal in a calculation; and the power control means may control a single-value control power or a multiple-value control power based on the calculation result of the arithmetic unit.

The power control means may control a duration of a recording pulse during recording.

The arithmetic unit may calculate a reference value from the detected wobble signal amplitude, and may use the reference value and the wobble signal amplitude in a calculation process.

The arithmetic unit may calculate the reference value for each of the attributes of a track, presence/absence of data in the track, recording/reproduction states of an apparatus, and combinations thereof, and may selectively use the reference value according to conditions such as the attributes of a track followed by the optical beam, presence/absence of data in the track, recording/reproduction states of the apparatus, and combinations thereof.

When controlling a power different from that determined when the reference value is obtained, the arithmetic unit may correct the reference value and the detected wobble signal amplitude according to the different power and performs a calculation process.

The power control means may determine whether control is performed, not performed, or stopped, or changes control modes according to a time period during which control works or an amount of a power to be controlled.

The power to be controlled may be used for reproducing data contained in the track.

The power to be controlled may be used for recording or erasing data in the track.

An optical disk apparatus according to the present invention for recording or reproduction on an optical disk including a track in which a recording region is wobble-processed, comprising: optical means for reading information from the optical disk or recording information in the optical disk: control means for controlling the optical means; signal generation means for generating a tracking error signal indicating a scanning state of the optical means on the track of the optical disk; extraction means for extracting a wobble signal component from the tracking error signal; amplitude detection means for detecting an amplitude of the wobble signal component extracted by the extraction means; a bias generation circuit for generating a bias voltage based on an output of the amplitude detection means; an arithmetic unit for outputting a calculation result obtained from the bias voltage generated by the bias generation circuit and an output voltage of the amplitude detection means according to a predetermined calculation rule; and recording power control means for controlling recording power during recording data, wherein during recording, the recording power is controlled based on the calculation result obtained by the arithmetic unit, whereby the above object is achieved.

The optical disk apparatus may be capable of recording data in a guiding groove portion and an inter-guiding groove portion of the optical disk; the optical disk apparatus may further include identification means for identifying whether a track scanned by the optical means is in the guiding groove portion or the inter-guiding groove portion: and the bias generation circuit may generate two types of bias voltages, a bias voltage for recording in the guiding groove portion and a bias voltage for recording in the inter-guiding groove portion, based on an output signal of the identification means.

The bias generation circuit may include a low-pass filter and may generate an average value of an output of the amplitude detection means or a bias voltage corresponding to a gradual change in amplitude on the order of a rotational component of a disk.

The calculation rule of the arithmetic unit may obtain a difference by subtracting the bias voltage generated by the bias generation circuit from the output voltage of the amplitude detection means; may assume the voltage generated by the bias generation circuit as being "1" and obtains a ratio of the difference to the voltage generated by the bias generation circuit, and according to the result, a current laser emission value is output as it is, or a value equivalent to the ratio of the difference is added to or subtracted from the current laser emission value which is assumed as being "1", and a value obtained by the addition/subtraction is output as a result.

The optical disk apparatus may further include optimum power detection means for detecting an optimum power during recording, wherein an amplitude of a wobble signal component may be detected while recording is performed at the optimum power determined by the optimum power detection means, and power control is performed based on the calculation result of the arithmetic unit.

In a learning process for the bias generation circuit, recording may be performed only with the optimum power determined by the optimum power detection means, and an average value of a wobble signal amplitude voltage during the recording may be used as an optimum bias voltage or an initial value of the bias voltage.

When a data error is detected in a data check operation immediately after data has been recorded, power control may be conducted based on the calculation result of the arithmetic unit so as to perform a recording operation again.

In the process of recording at an optimum power determined by the optimum power detection means and further recording with power control based on the calculation result of the arithmetic unit, when a set power for recording exceeds a predetermined range, the apparatus may provide a cautionary alarm about such being an abnormality of the optical disk or the apparatus.

In the process of recording with power control based on the calculation result of the arithmetic unit, when a set power for recording exceeds a predetermined range for a predetermined time period, the apparatus may provide a cautionary alarm about such being as an abnormality of the optical disk or the apparatus.

In the process of recording with power control based on the calculation result of the arithmetic unit, when a set power for recording exceeds a predetermined range for a predetermined time period, a portion in which the recording has been performed may be treated as being inappropriate for recording.

The calculation rule of the arithmetic unit may be a difference between the bias voltage generated by the bias generation circuit and the output voltage of the amplitude detection means.

The calculation rule of the arithmetic unit may assume that the bias voltage generated by the bias generation circuit is "1", may calculate a positive square root of the output voltage generated by the amplitude detection means, and may provide a difference between a value of the positive square root and "1" as a calculation result.

The calculation rule of the arithmetic unit may assume that the bias voltage generated by the bias generation circuit as being "1", may calculate a positive square root of the output voltage generated by the amplitude detection means, and may provide a reciprocal of the positive square root as a calculation result.

The arithmetic unit may generate a calculation result when a difference between the bias voltage generated by the bias generation circuit and the output voltage generated by the amplitude detection means exceeds a predetermined range; and the recording power control means may conduct power control based on the calculation result of the arithmetic unit.

The optical disk apparatus may further include optimum power detection means for detecting an optimum recording power during recording, wherein the recording power control means may detect an amplitude of a wobble signal component while recording is performed at an optimum power determined by the optimum power detection means, and may conduct power control based on the calculation result of the arithmetic unit.

An optical disk apparatus according to the present invention for recording or reproduction on an optical disk including a track in which a recording region is wobble-processed includes: optical means for reading information from the optical disk or recording information in the optical disk; control means for controlling the optical means; signal generation means for generating a tracking error signal obtained when the optical means follows the track of the optical disk; detection means for detecting attributes of the track followed by the optical means which includes presence/absence of information; extraction means for extracting a wobble signal component from the tracking error signal; amplitude detection means for detecting an amplitude of the wobble signal component extracted by the extraction means; reference value generation means for generating a reference value for each attribute of the track based on the attributes of the track which have been detected by the attribute detection means and an output of the amplitude detection means; an arithmetic unit for calculating a transmissivity of light transmitted from a disk surface to a recording layer or an amount of directed light on the recording layer of the medium from the reference value generated by the reference value generation means and the output voltage of the amplitude detection means, and outputting required power of a light source calculated based on a value of the transmissivity or a value of the amount of directed light as a calculation result; and power control means for controlling the power of the light source of an optical beam spot directed to the optical disk, wherein the recording power control means controls the power of the light source in a manner recited in claims 5–10 based on the calculation result obtained by the arithmetic unit, whereby the above object is achieved.

A threshold may be provided for the calculation result obtained based on the detected wobble signal amplitude and the apparatus may detect that the calculation result exceeds the threshold or that the calculation result exceeds the threshold for a predetermined time period, whereby the apparatus may detect an abnormal state in the control means for controlling the optical means and changes its operation state.

The optical disk apparatus may read information from or records information in multiple types of disks; the optical disk apparatus may include detection means for detecting the type of disk; and the optical disk apparatus may conduct/may not conduct power control for the light source of the optical beam based on the calculation result, or may change an operation mode according to the type of disk detected by the detection means or a duration of recording/reproduction of data or a duration of power control.

According to one aspect of the present invention, when an apparatus records data on a disk a wobble signal included in a tracking signal is extracted to detect a signal amplitude thereof, whereby dirt on a disk substrate or a focusing state of the apparatus is detected. During recording, power control is conducted according to the amplitude information, whereby reliability of the apparatus during recording of data can be improved.

According to another aspect of the present invention, when an apparatus records data on a disk, an operation for checking recorded data is performed. Only when there is an error in the written data, power control is conducted based on amplitude information of a wobble signal component, and a rewriting operation is performed. Thus, the present invention is applied to the minimum of data that the apparatus failed to write and that need to be rewritten, whereby reliability of recorded data can be improved.

According to still another aspect of the present invention, when a recording operation is performed at a power exceeding a predetermined range, the apparatus provides a cautionary alarm, whereby a user of the apparatus is informed of an abnormality of the apparatus or disk.

According to still another aspect of the present invention, when a set power exceeds a predetermined range for a predetermined time period, a portion recorded at the power is treated as being inappropriate for recording, and a verifying operation is omitted, whereby a processing speed can be increased.

BEST MODE FOR CARRYING OUT THE INVENTION

Embodiment 1

Hereinafter, embodiments of the present invention will be described with reference to FIGS. 1 and 2.

Figure 1:
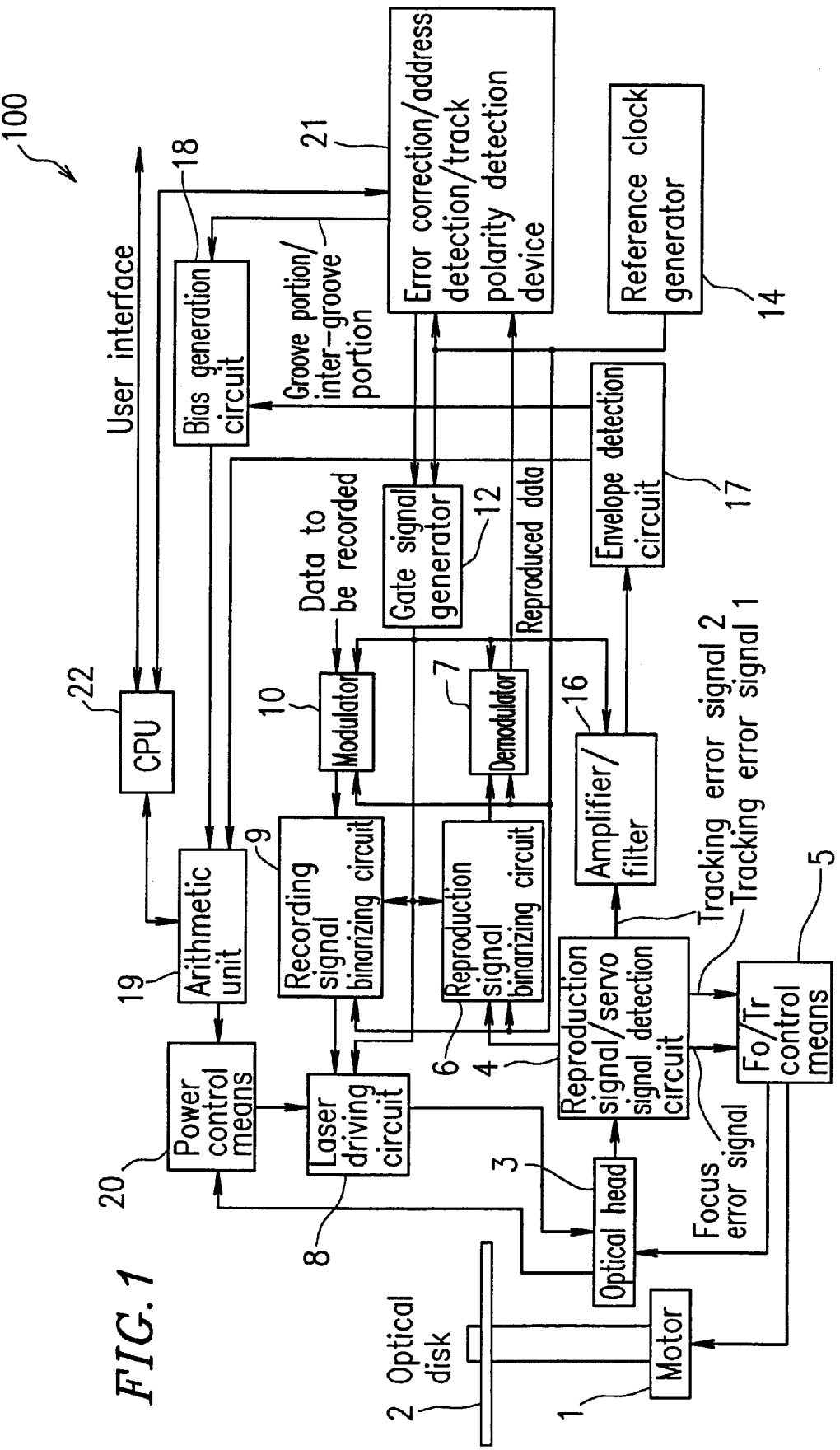
FIG. 1 is a block diagram of an optical disk recording/reproducing device according to embodiment 1.
Figure 2:
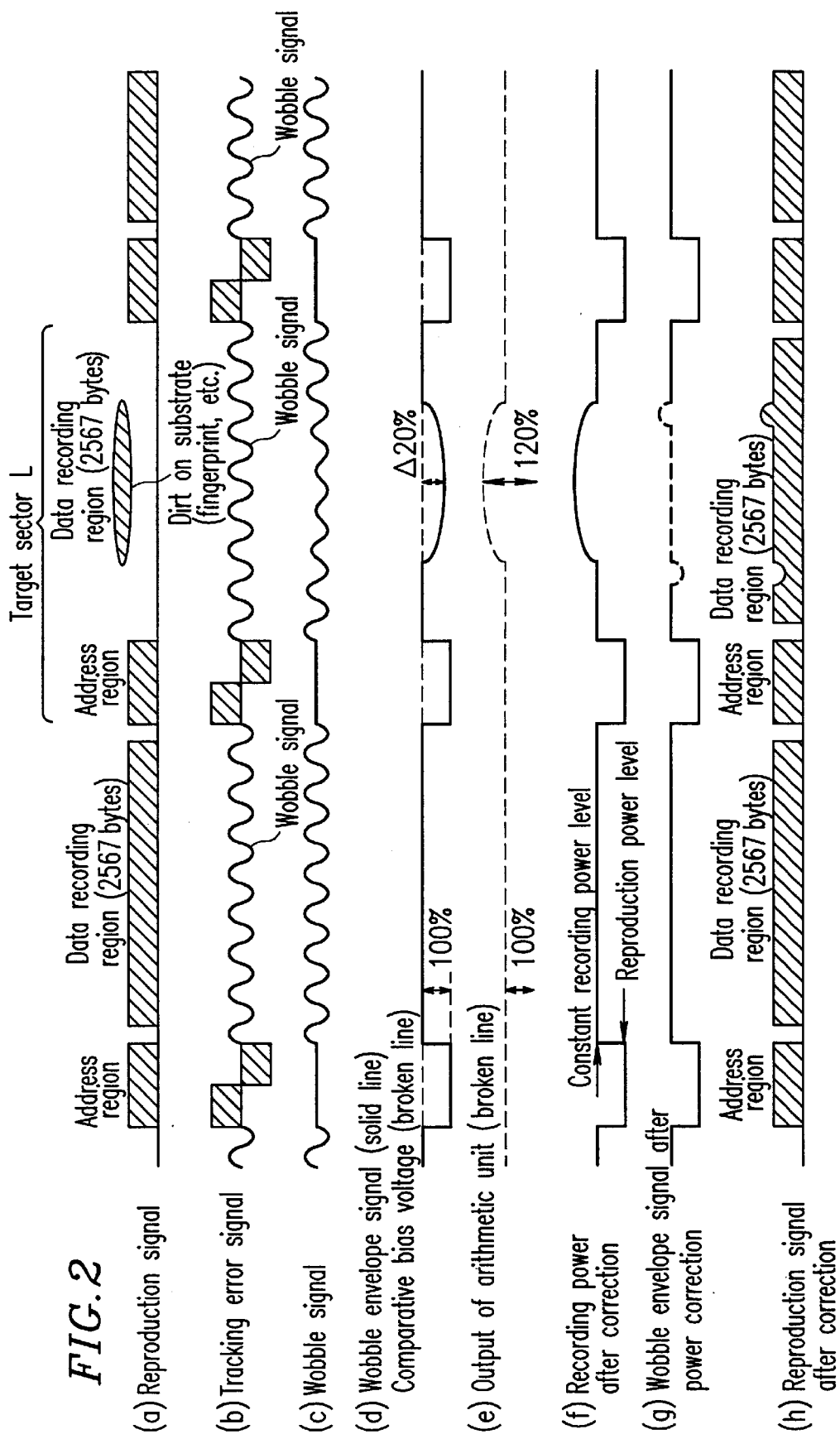
FIG. 2 is a chart for describing an operation of the optical disk recording/reproducing device according to embodiment 1.

FIG. 1 shows a block diagram of an optical disk recording/reproduction apparatus of the present invention.

In FIG. 1, elements 1 to 15 have the same structures as the conventional structures, and accordingly, the description thereof is omitted.

Reference numeral 16 denotes an amplifier/filter for extracting a wobble signal component from a tracking error signal output from the reproduction signal/servo signal detection circuit 4; reference numeral 17 denotes an envelope detection circuit for detecting the amplitude of a wobble signal which is an output signal of the amplifier/filter 16; reference numeral 18 denotes a bias generation circuit for using an output of the envelope detection circuit to generate a target voltage; reference numeral 19 denotes an arithmetic unit for outputting an operation result obtained from voltages generated by the bias generation circuit 18 and the envelope detection circuit 17 according to a predetermined algorithm; and reference numeral 20 denotes recording power setting means capable of setting a power in the laser driving circuit 8 based on the set power of a CPU 22 and an operation result of the arithmetic unit 19.

An optical disk recording/reproduction apparatus having such a structure according to the present embodiment will be described with reference to FIG. 2.

A signal read out through the optical head 3 is output by the reproduction signal/servo signal detection circuit 4 as a reproduction signal shown in FIG. 2(a) and a tracking error signal shown in FIG. 2(b). The amplifier/filter 16 extracts only a wobble signal component from the tracking error signal. FIG. 2(c) shows a wobble signal. When recording is performed at constant power without the power control of the present invention, the signal amplitude of the extracted wobble signal decreases in a portion where dirt, such as a fingerprint, is present on the substrate as shown in FIG. 2(c). Moreover, the output voltage of the envelope detection circuit 17 decreases in a portion where dirt is present on the substrate as shown in FIG. 2(d). The arithmetic unit 19 receives an envelope signal of the wobble (solid line of FIG. 2(d)) and an output voltage of the bias generation circuit 18 (broken line of FIG. 2(d)). As a result, the arithmetic unit 19 outputs a voltage as shown in FIG. 2(e).

In the present embodiment, an operation in the arithmetic unit 19 is a simple difference detection. In an actual operation, the difference between an output voltage of the bias generation circuit 18 and an output voltage of the envelope detection circuit 17 is calculated, and what percentage of the output voltage of the bias generation circuit 18, which is assumed as being "1", is equal to the difference is calculated and output as a calculation result.

As the output voltage of the bias generation circuit 18, a peak value of the wobble envelope signal, a direct voltage which has been obtained by processing the wobble envelope signal with a filter having a large time constant and which varies according to the rotation of the disk, or the like, can be used.

In the present embodiment, the recording power is controlled by adding the output of the arithmetic unit 19 to the recording power. After the recording power has been controlled, in a portion where the signal amplitude is decreased due to dirt on the substrate, recording is performed at an increased recording power as shown in FIG. 2(f). Since it is a matter of course that, in an address portion, the emission power of a laser is forcibly reduced to a reproduction level, the output of the arithmetic unit 19 exhibits a large voltage value; however, the power of the laser is at a reproduction level. FIG. 2(g) shows a wobble envelope signal which is actually detected at the controlled power. During recording of data, the recording power is controlled so that this level is substantially equal to the output of the bias generator.

Furthermore, a reproduction signal of data recorded under the above control is shown in FIG. 2(h).

The present embodiment has been described with a calculation in the arithmetic unit 19 being a simple difference detection. However, it is possible to construct an arithmetic unit such that in the case where the amplitude variation of the wobble signal is large even during a normal recording operation, the calculation result is output only when the difference between the inputs of the arithmetic unit 19 exceeds a threshold, and when the difference is below the threshold, the "100% (no control)" value is output.

Furthermore, the operation in the arithmetic unit 19 is not limited to a simple difference detection. There is another possible operation in which the output of the bias generation circuit 18 is assumed as being "1", the square root of an output value of the envelope detection circuit 17 is obtained, a subtraction of this square root from "1" is added to "100%", and the result of this addition is used as an output.

As described above, the present invention provides an apparatus in which the amplitude of a wobble signal is detected during a recording operation at a set optimum recording power, the signal is compared with a level recognized as being optimum, and a recording power is controlled using the difference as an increase of the recording power, whereby highly reliable recording can be performed even when dirt is attached on the substrate of the disk.

Furthermore, in the present invention, if a combination of a disk and an apparatus is previously limited, the amplitude voltage of the wobble signal can be recognized as constant among various apparatuses. The amplitude voltage can be used as a target value to constantly control the optimum recording power.

In the above embodiment, the description has been focused on dirt on a substrate of the disk, such as a fingerprint or the like. However, it is known that the amplitude of the wobble signal can be decreased due to defocusing or off-tracking of an optical disk or due to tilting caused when mounting an optical head or tilting caused by a curvature of the disk. Thus, with the wobble signal, malfunction of the apparatus can be detected as well as dirt on the substrate of the disk, etc.

Furthermore, the CPU 22 may read from the power control means 20 power added by the power control based on the amplitude of the wobble signal. In this way, it is possible to inform a user of a malfunction of an optical disk or an apparatus when the value of the power exceeds a threshold.

Embodiment 2

Figure 3:
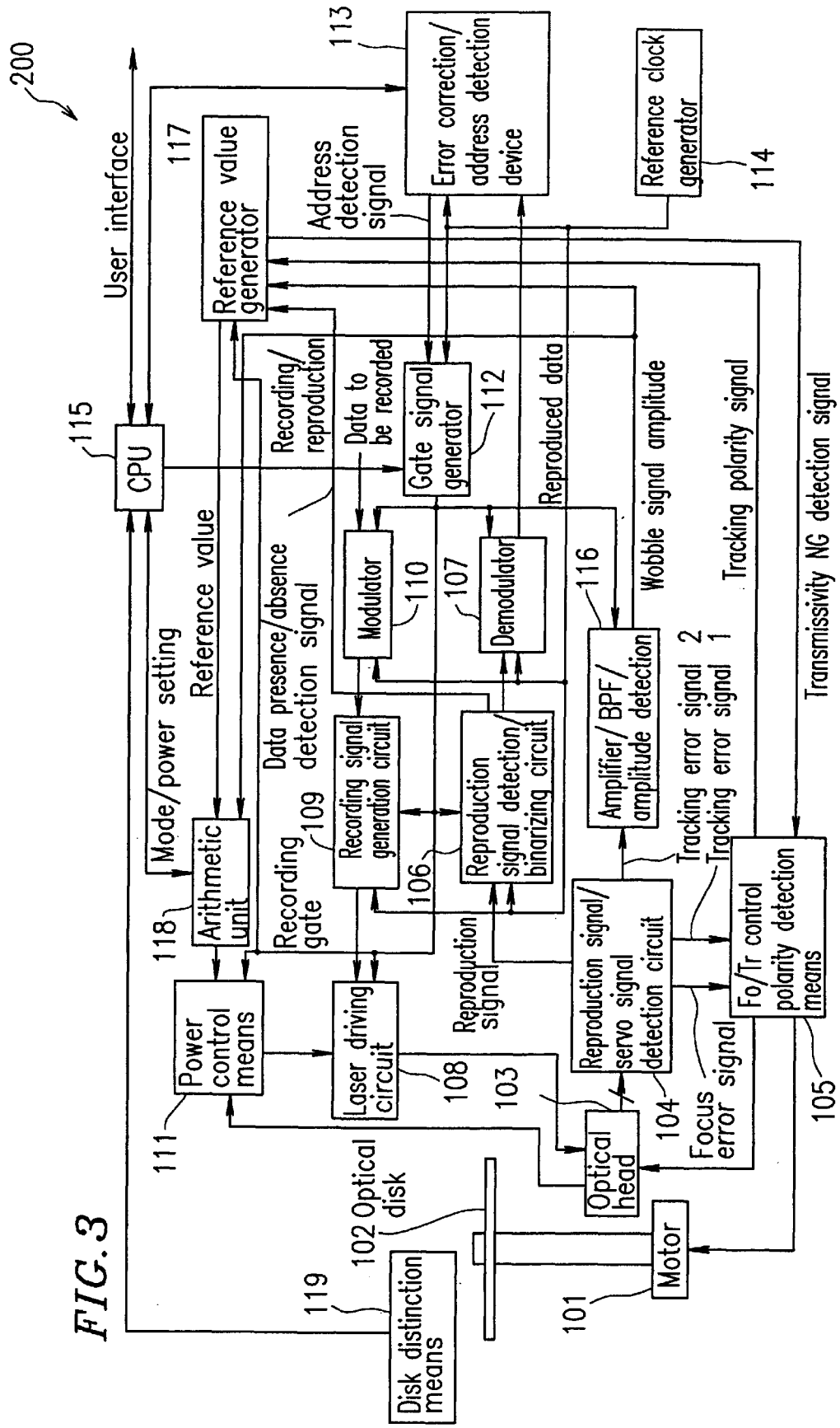
FIG. 3 is a block diagram of an optical disk recording/reproducing device according to embodiment 2.

Embodiment 2 of the present invention is shown in FIG. 3.

In FIG. 3, reference numeral 101 denotes a motor; reference numeral 102 denotes an optical disk; reference numeral 103 denotes an optical head for converting reflected light from the disk into an electric signal and outputting the signal to a reproduction signal/servo signal detection circuit 104; reference numeral 104 denotes the reproduction signal/servo signal detection circuit for generating a reproduction signal, a focus error signal, a tracking error signal 1, and a tracking error signal 2 from an output signal obtained from the optical head 103; reference numeral 105 denotes focus/tracking control means for controlling the optical head 103 by using a servo signal from the reproduction signal/servo signal detection circuit 104, for controlling the motor 101, and for notifying a reference value generator 117 about the polarity of a track presently being scanned; reference numeral 106 denotes a reproduction signal detecting/binarizing circuit for detecting the presence/absence of data and notifying the reference value generator 117 of such and for binarizing the reproduction signal; reference numeral 107 denotes a demodulator for demodulating the binarized reproduction signal so as to generate reproduction data; reference numeral 108 denotes a laser driving circuit for driving a laser which is a light source of the optical head 103; reference numeral 109 denotes a recording signal generation circuit for generating a signal for modulating laser light by the laser driving circuit based on the data obtained after modulation; reference numeral 110 denotes a modulator for modulating data to be recorded so as to generate a signal which is supplied to the recording signal generation circuit; reference numeral 111 denotes power control means for controlling the laser power during recording/reproduction of data; reference numeral 112 denotes a gate signal generator for generating various gate signals based on a clock of a reference clock generator 114; reference numeral 113 denotes an error correction/address detection device for detecting and correcting an error amount of the reproduction data demodulated by the demodulator 107 and for detecting an address in the reproduction data sequence; reference numeral 114 denotes the reference clock generator for generating a reference clock for recording/reproduction of data; reference numeral 115 denotes a CPU which provides the error correction/address detection circuit with a command to measure a BER, which can set the mode for the power setting or the laser power control in an arithmetic unit, and which manages a user interface: reference numeral 116 denotes an amplifier/bandpass filter/amplitude detection circuit for amplifying the tracking error signal 2 generated by the reproduction signal/servo signal detection circuit 104, for extracting a wobble signal, and for detecting the amplitude; reference numeral 117 denotes the reference value generator for generating a reference value for each of the attributes of a track which are determined based on the polarity of the track, the presence/absence of data, and the recording/reproduction state of the apparatus according to the detected value of a wobble signal amplitude from the disk which has been output from the amplifier/bandpass filter/amplitude detection circuit 116; reference numeral 118 denotes an arithmetic unit for performing calculation of output values of the amplifier/bandpass filter/amplitude detection circuit 116 and the set power from the CPU 115 to output a control signal to the power control means; and reference numeral 119 denotes disk distinction means.

An output signal read out from the optical disk 102 by the optical head 103 is supplied by the reproduction signal/servo signal detection circuit 104 to a subsequent processing circuit as a reproduction signal, a focus error signal, a tracking error signal 1, and a tracking error signal 2. The focus error signal and the tracking error signal 1 are supplied to the focus/tracking control means 105, and the focus/tracking control means 105 controls the optical head 103 so as to follow the wavering of the disk surface and decentration of the disk. At the same time, in a DVD-RAM disk in which a recording region includes a guiding groove portion and an inter-guiding groove portion, tracking of the optical head 103 is controlled so as to be in one of the guiding groove portion and the inter-guiding groove portion. A signal indicating the guiding groove portion or the inter-guiding groove portion is supplied to the reference value generator 117 as one of the attributes of the track. The reproduction signal is supplied to the reproduction signal detecting/binarizing circuit 106, and a binarized data sequence and a read clock synchronized with the data are output to the demodulator 107. At the same time, in the same circuit, the presence/absence of a signal is detected and supplied to the reference value generator 117 as one of the attributes of a track being reproduced.

The reference clock generator 114 generates a reference clock which is necessary to modulate/demodulate data to be recorded/reproduced in this apparatus. The demodulator 107 performs conversion using the supplied binarized data sequence and the read clock according to a demodulation rule, and outputs the converted data to the error correction/address detection device 113 using the reference clock. The output reproduction data is supplied to the subsequent error correction/address detection device 113, and the subsequent error correction/address detection device 113 detects an address position on the track. An address signal detection signal is supplied to the gate signal generator 112, and the gate signal generator 112 uses this signal as a position reference on the track so as to generate a gate signal which is necessary in recording/reproduction using the reference clock.

In order to record data, data to be recorded is converted into a data sequence to be recorded by the modulator 110 according to a modulation rule. The data sequence obtained by the conversion is further converted by the recording signal generation circuit 109 into a signal for modulating laser light, and the signal is supplied to the laser driving circuit 108. The laser driving circuit 108 modulates the laser light which is a light source of the optical head 103 for recording data on the disk. The recording is performed at a recording power determined by the arithmetic unit 118. The reference value generator 117 receives a polarity signal of the above track, a data presence/absence detection signal, and a recording gate indicating a recording/reproduction state of the apparatus. The reference value generator 117 generates respective reference values from a wobble signal amplitude which is input for each of the combinations of the above three signals, and supplies the respective reference values to the arithmetic unit 118. The arithmetic unit 118 calculates the transmissivity of the disk, and generates a control signal for adjusting a recording power on a recording layer of the disk to be the recording power set by the CPU 115. In the calculation of the arithmetic unit 118, a wobble signal amplitude from the disk which is output from the amplifier/bandpass filter/amplitude detection circuit 116 and a value from the reference generator 117 are used.

Figure 4:
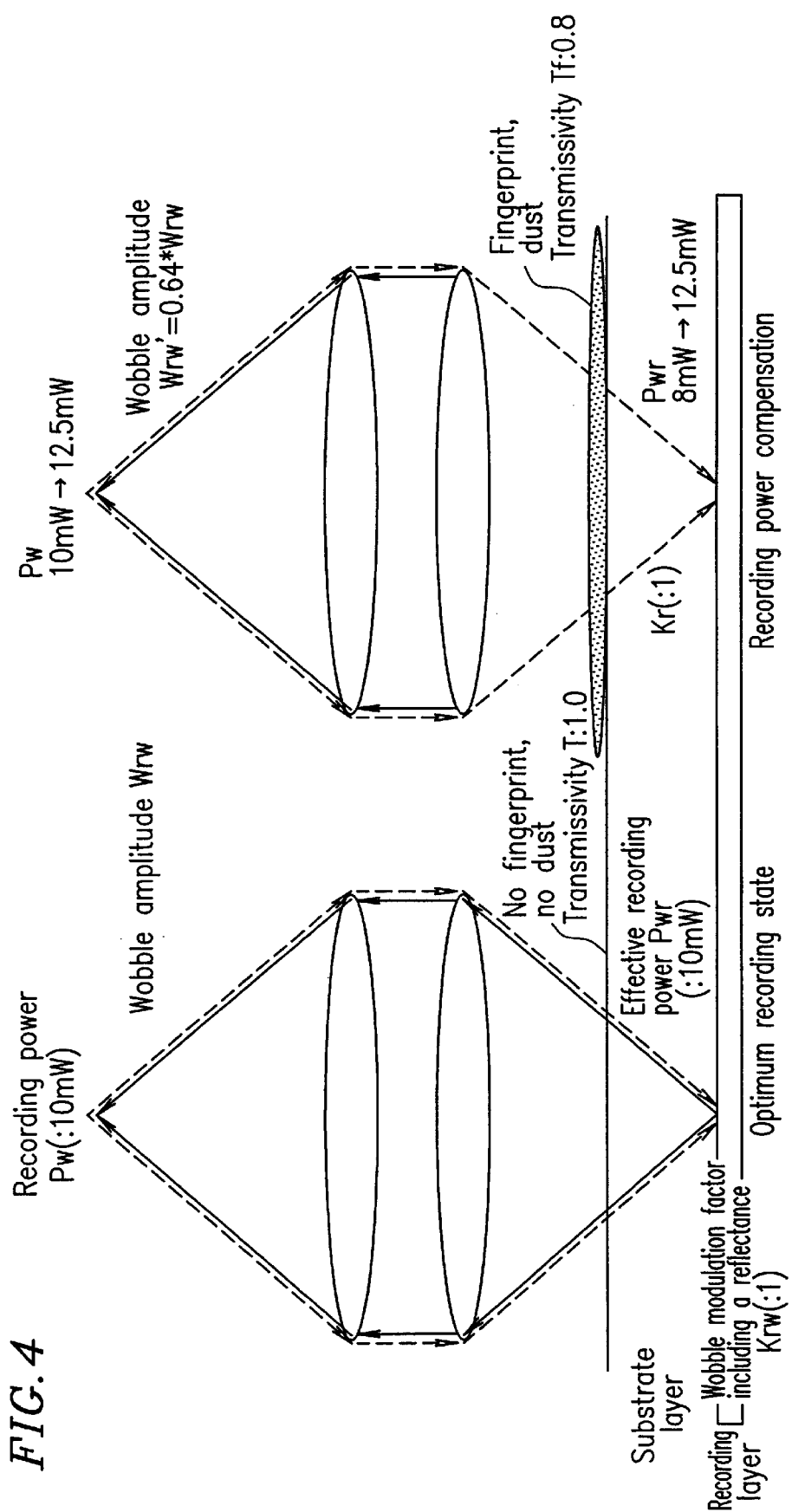
FIG. 4 is a diagram for illustrating a recording principle according to embodiment 2.
Figure 14:
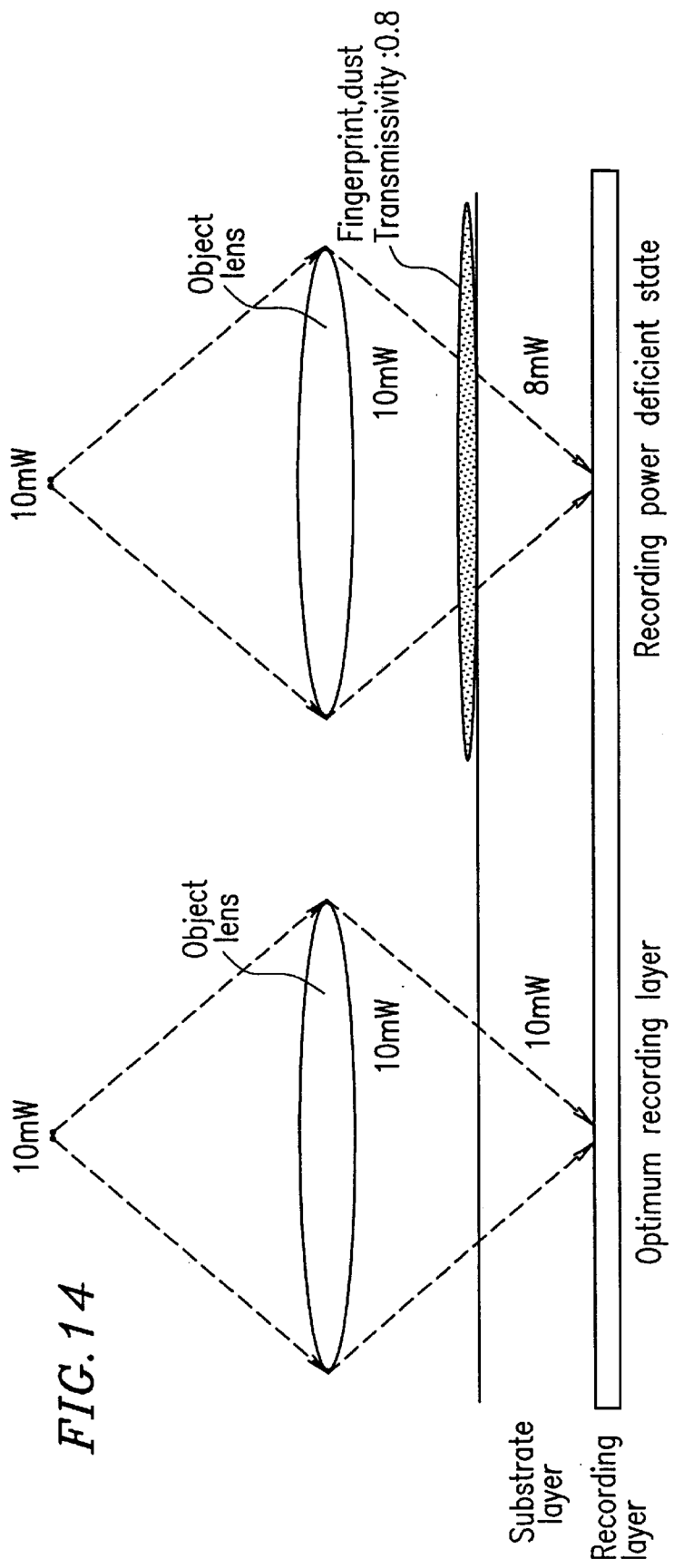
FIG. 14 is a diagram for illustrating a recording operation of the conventional optical disk recording/reproducing device.
Figure 15:
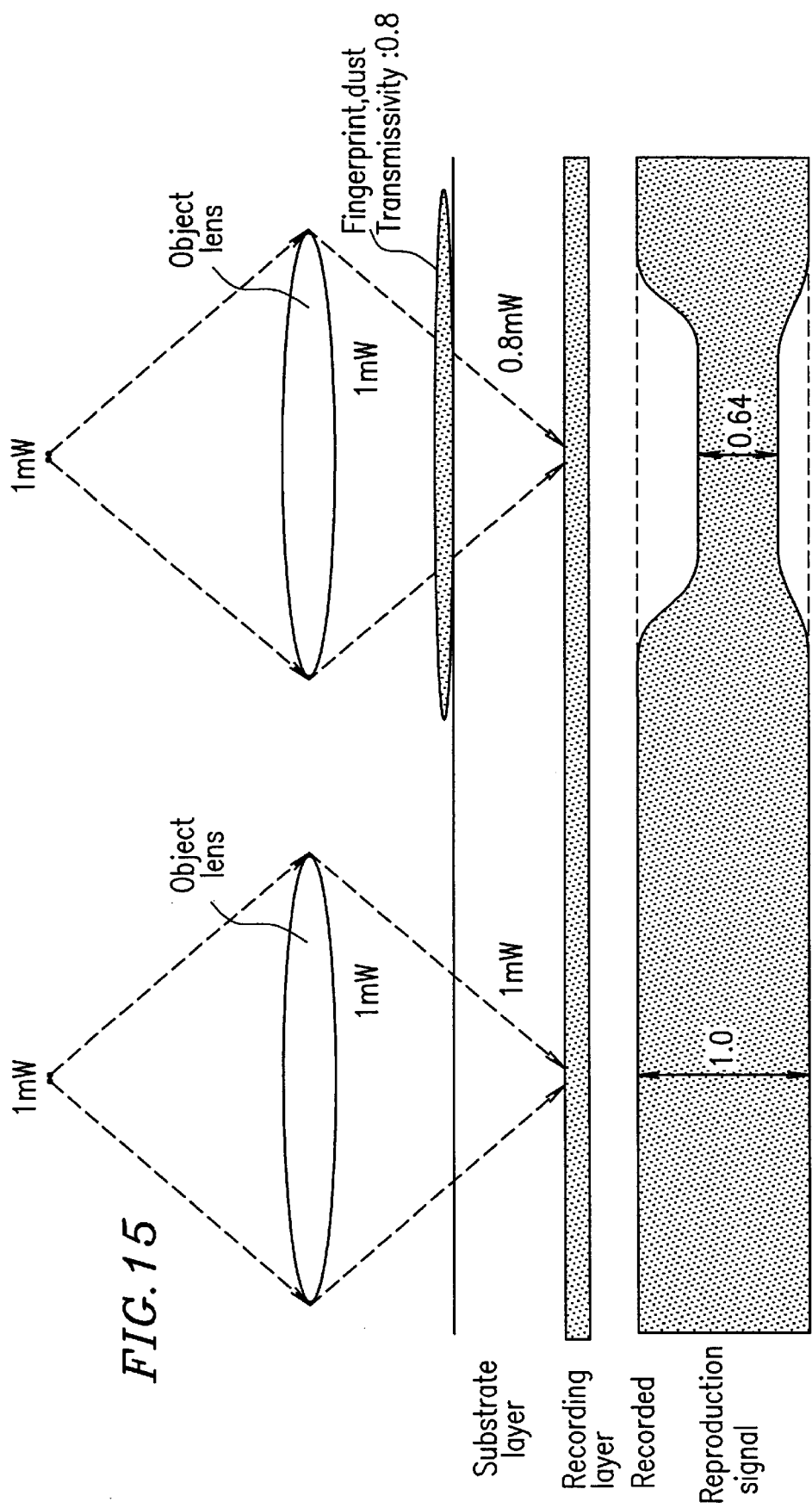
FIG. 15 is a diagram for illustrating a reproducing operation of the conventional optical disk recording/reproducing device.
Figure 16:
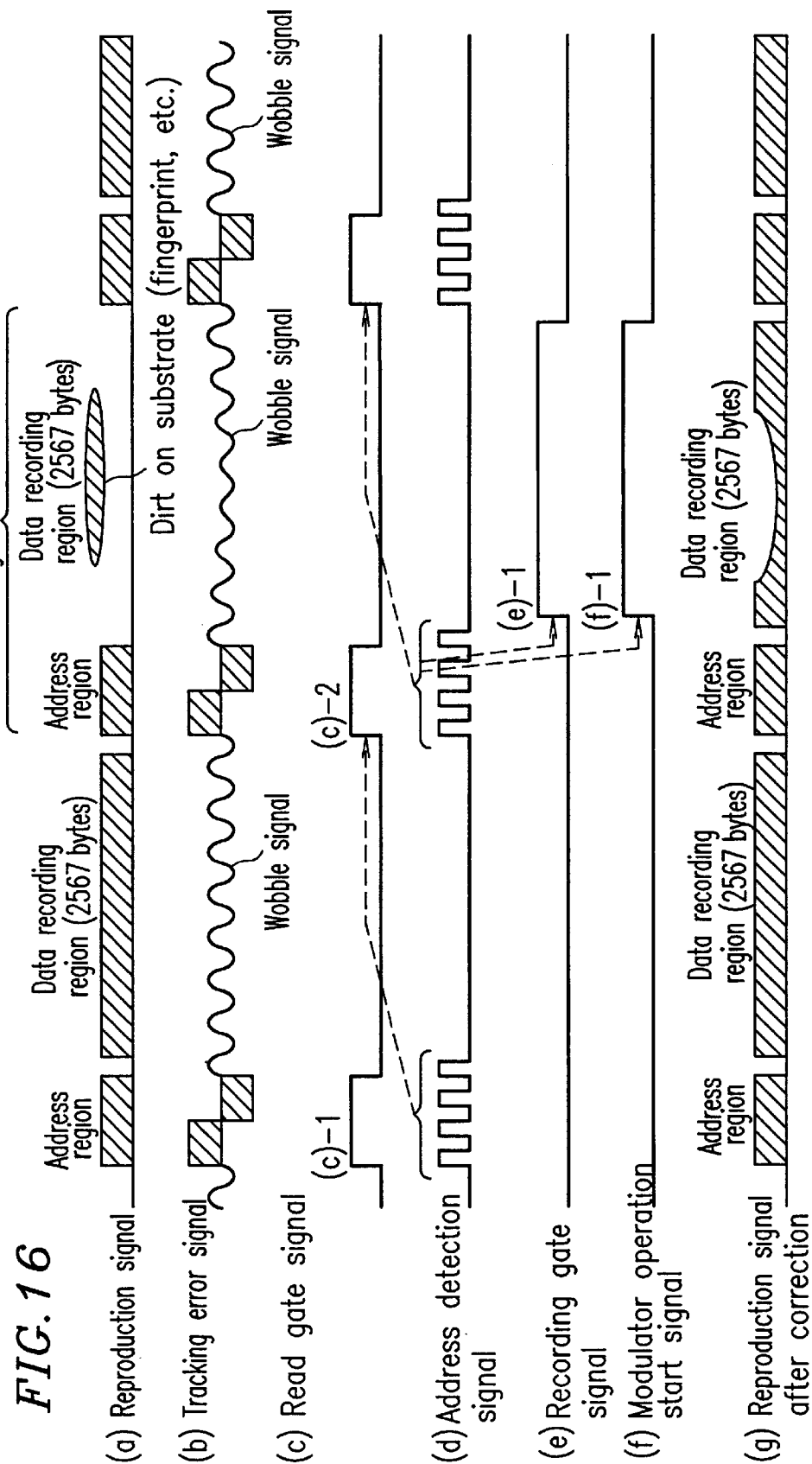
FIG. 16 is a chart for describing an operation of the conventional optical disk recording/reproducing device.

Details of the power control principle are described with reference FIGS. 4 and 14. As shown in FIG. 14, recording power control in a conventional apparatus is to control the emission power of the laser. Therefore, in a portion where an attachment, such as a fingerprint or dust, is present on the disk surface, an effective recording power is insufficient. As a result, an appropriate recording cannot be performed.

According to embodiment 2, when recording is performed on the disk with a fingerprint or dust attached thereon, a wobble signal amplitude is detected from the disk during recording, and the transmissivity of a fingerprint or dust attached on the disk surface is calculated, whereby the irradiation amount of the laser actually illuminating the recording layer is controlled.

Details are described with reference to FIG. 4. First, a portion with no fingerprint attached is considered. The light amount of the laser effectively directed to the recording layer, Pwr (mW), is $$Pwr = Pw \times T \quad (1)$$

where Pw (mW) denotes the laser recording power at the output of an object lens, T denotes the transmissivity of the disk substrate (=1), Tf denotes the transmissivity of an attachment on the disk surface, and Krw denotes the wobble modulation factor including reflectance.

Thus, a laser emission amount required for recording is:

$$Pw = Pwrs/T \quad (1)'$$

where Pwrs denotes an optimum effective recording power on the recording layer. Moreover, a wobble signal detected at this time, Wrw, is obtained by multiplying the effective power Pwr by the wobble modulation factor including reflectance, Krw, and further multiplying by the transmissivity of the substrate:

$$Wrw = Pw \times T \times Krw \times T = Pw \times Krw \times T^2 \quad (2)$$

Above expression (2) can be modified into expression (3):

$$T = (Wrw/(Pw \times Krw))^{0.5} \quad (3)$$

where Krw is a constant value determined for each disk which is obtained by experiment, and Pw is a known value for an output power. Based on expression (3), the transmissivity of the disk substrate is obtained. Accordingly, Pw is obtained by expression (1)' in order to control the required effective power Pwr to be constantly set to the optimum effective recording power Pwrs.

Next, control which uses a reference value is described. A wobble signal amplitude Wrws obtained when recording is performed in a portion with no attachment at an optimum recording power Pws is used as a reference value.

The wobble signal amplitude Wrws is represented by expression (2):

$$Wrw = Pw \times Krw \times T^2$$

Ideally, T=1. In this case, $$Wrws = Pws \times Krw \quad (2)'$$

Next, in a portion with a fingerprint attached thereon, a wobble signal Wrw' is represented as:

$$Wrw' = Pws \times Tf \times Krw \times Tf = Pws \times Krw \times Tf^2 \quad (4)$$

In the case where Tf is 0.8, combining expression (2)' into expression (4), a detected wobble signal amplitude is represented as:

$$Wrw' = Wrws \times Tf^2 = 0.64 \times Wrws \quad (5)$$

Expression (5) is modified into:

$$Tf = (Wrw'/Wrws)^{0.5} = 0.64^{0.5} = 0.8 \quad (6)$$

Thus, when Pwrs=10 mW, the required power Pw is:

$$Pw = Pwrs/Tf = 10/0.8 = Pwrs \times 1.25 = 12.5 \text{ mW}.$$

When the control is performed during a recording operation in an actual apparatus, the detected wobble amplitude Wrw' is varied by the power, which is controlled as described above. Therefore, when control formed by a control loop is repeatedly performed, the amplitude of the detected wobble signal or the reference value should be corrected during calculation according to a scaling factor of the power used for determining the reference value for the controlled power.

For example, assuming that an apparatus in which the recording power is controlled stepwise is used in the above example, and Tf is first detected as being 0.8, the recording power Pw is the optimum recording power Pws multiplied by 1/Tf, i.e., 1.25. In the case where the control is performed without correction, a subsequently detected wobble signal amplitude is 1.25 times greater than the previous signal, and the ratio of the detected wobble signal amplitude to the reference wobble signal amplitude value is 0.64×1.25, i.e., 0.8. Then, the recording power is corrected with the square root of 0.8, such that the recording power becomes 1.12 times greater than the optimum recording power Pws. In this way, the recording power gradually changes without changing the transmissivity of a fingerprint Tf.

Furthermore, correction is necessary when the recording power Pw is different from the recording power Pws used for obtaining the above reference value Wrws. Now, assume that the optimum recording power is different between an outer track and an inner track, and the reference value of the wobble signal amplitude is determined on the inner track. If the set recording power is greater in the outer track than in the inner track, the detected wobble signal amplitude is recognized as being small, and as a result, excessive power is provided.

Now, a specific description is made. Assume that the recording sensitivity is different between an outer track and an inner track of the disk because of any reason, and an actual recording power Pw is different from an optimum recording power Pws on a track in which a reference value Wrws has been obtained. Herein, the reference value Wrws is obtained using an optimum recording power Pws on the inner track.

The apparatus performs a retrieving operation, and performs control in the outer track. Assuming that the scaling factor of an optimum recording power in this track is Cp (Cp<1), and other parameters such as Krw, etc., are the same, the reference value of the wobble signal amplitude in this outer track, Wrws2, is represented as:

$$Wrws2 = Pws \times Cp \times T \times Krw \times T = Pws \times Krw \times Cp = Wrws \times Cp \qquad (7)$$

However, when correction is not made, the detected wobble signal amplitude is Cp times greater than the reference wobble signal amplitude, and accordingly, the power correction is performed by a factor of 1/(the square root of Cp). As a result, recording cannot be performed at optimum power. In other words, in the case where optimum recording power on a track in which recording is performed is different from an optimum power on a track in which the reference value is determined, a value obtained by multiplying the reference value by a scaling factor of a control power used for actual recording with respect to the power used for obtaining the reference value can be used in another track as a reference value.

Figure 5:
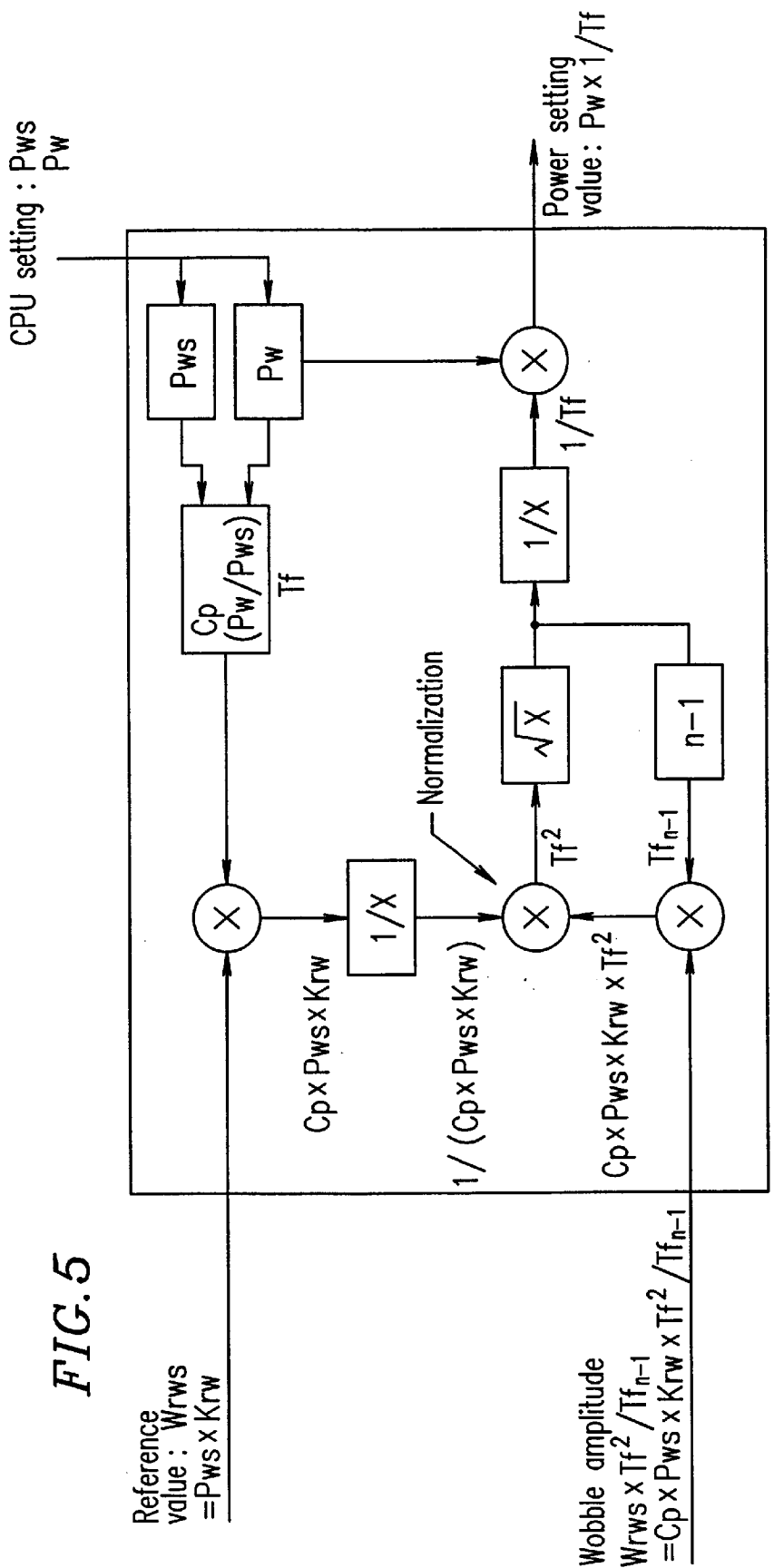
FIG. 5 is a block diagram of an example of an arithmetic unit according to embodiment 2.

Correction for a case where the above set recording power is different and correction for a case where the recording power is changed by control are described with reference to FIG. 5. FIG. 5 shows an example of an arithmetic unit for controlling the recording power while performing the above correction.

In FIG. 5, the reference value obtained using a recording power Pws is input and multiplied by a correction factor Cp (Pw/Pws) for the above recording power Pw to be controlled. A value obtained by this multiplication is used as an optimum reference value for modifying the optimum recording power.

On the other hand, in order to correct a detected value with a set power Pw, a detected wobble signal amplitude is multiplied by a detected value of a wobble amplitude (Pw×1/Tf$_{n-1}$×Tf$^2$×Krw) which corresponds to the current laser power (Pw×1/Tf$_{n-1}$) determined based on the transmissivity of the previous attachment (Tf$_{n-1}$), whereby a wobble amplitude corresponding to the recording power Pw is obtained.

The wobble amplitude obtained based on the recording power Pw is:

$$Pw \times Tf^2 \times Krw = Cp \times Pws \times Tf^2 \times Krw.$$

This value is normalized by a corrected reference value Cp×Wrws(=Cp×Pws×Krw).

The normalization is performed by dividing the product of the detected wobble amplitude and the corrected value of the recording power by a correct reference value obtained after the optimum recording power has been modified.

$$Cp \times Pws \times Tf^2 \times Krw / Cp \times Pws \times Krw = Tf^2$$

The recording power Pw is multiplied by a factor of 1/(the positive square root of the normalized wobble amplitude) (=1/Tf), and the value obtained by the multiplication is output. In the process of modifying the set recording power by the above calculations, the transmissivity of the disk is constantly obtained based on the wobble amplitude, whereby the optimum recording power can be successively controlled.

Furthermore, there is an alternate possible method which can be performed in place of the above-described correction. A portion on which a recording operation is to be performed is first reproduced at a constant power, and a wobble signal obtained at this time is stored. Then, when the recording operation is actually performed, a target value for a recording power is calculated from the stored wobble amplitude.

As in the above description, the calculation is performed solely with a detected wobble amplitude, otherwise, a reference value is determined from the detected wobble signal, and a calculation of the reference value and a wobble amplitude when a fingerprint or dust is present on a disk surface is performed, whereby power can be controlled. However, in an actual apparatus, the reference value may be varied according to differences in attributes of a track, e.g., differences between a guiding groove portion and an inter-guiding groove portion, a difference in reflectance among disks, a difference in reflectance due to the presence/absence of recorded data in a track, etc. For example, it is sometimes necessary to change the reference value by determining a reference signal according to information in guiding groove/inter-guiding groove portions of a track which is being scanned by control means, a data record presence/absence signal in a reproduction signal processing circuit, or attributes of each track which are determined according to the recording/reproduction state of the apparatus. As possible means for changing the reference value, there is a method in which an A/D converter is used for obtaining a reference value, digital outputs of the converter for the respective attributes are averaged, and this averaged value is adjusted for each of the combinations of the attributes.

In the above example, control has been described with an example of recording power control. However, it is needless to say that the above control can be applied to power control during reproduction.

Next, an example of power control during reproduction is described. A problem which occurs in a conventional apparatus during reproduction is that when reproduction is performed at a constant laser power, the transmissivity of light on a disk surface is partially varied due to a fingerprint, dust, or the like, attached thereon, and accordingly, variation in a DC component or an amplitude of a reproduction signal is caused. Now, a method for controlling the power by stabilizing the amplitude of the reproduction signal is described.

In a portion with no attachment, the reproduction signal amplitude Vrfs is represented as:

$$Vrfs = Pps \times Krf \times T^2$$

where Pps denotes an optimum laser power for reproduction in the portion with no attachment, T denotes the transmissivity of a disk substrate in the portion with no attachment, Tf denotes the transmissivity of the attachment, and Krf denotes a modulation factor.

Ideally, T=1. Thus, $$Vrfs = Pps \times Krf \qquad (8)$$

In a portion with an attachment, the reproduction signal amplitude Vrf' is represented as:

$$Vrf' = Pps \times Krf \times Tf^2 \qquad (9)$$

The reproduction power Pp is controlled for keeping a reproduction signal constant. From expressions (8) and (9), $$Pp = Pps \times Vrfs/Vrf' = Pps \times Krf/(Krf \times Tf^2) = Pps \times 1/Tf^2$$

Thus, when light emission is performed at a power obtained by multiplying an optimum power by a factor of $1/Tf^2$, the amplitude can be kept constant.

On the other hand, from expression (4), the wobble signal amplitude Wrps in a portion with no attachment can be expressed as:

$$Wrps = Pps \times Krw \times T^2$$

where Krw is a modulation factor for a recording layer including a reflectance. Since ideally, T=1:

$$Wrps = Pps \times Krw \qquad (10)$$

In a portion with an attachment, a wobble signal amplitude Wrp' detected on a disk can be expressed similarly to expression (4):

$$Wrp' = Pps \times Tf \times Krw \times Tf = Pps \times Krw \times Tf^2 \qquad (11)$$

From expressions (10) and (11), $$Wrps/Wrp' = 1/Tf^2 \qquad (12)$$

With the obtained value $1/Tf^2$, the power can be controlled.

The wobble signal amplitude Wrps is output as a reference value for reproduction from the reference value generator 117 to the arithmetic unit 118. During reproduction, the arithmetic unit 118 performs the above calculations to control the power control during reproduction, whereby a reproduction amplitude can be kept constant. In view of the above expressions, it is possible to use a reproduction signal amplitude for power control. However, a wobble signal amplitude is preferable because when the power control is performed based on the reproduction signal, if an unrecorded sector is present among the recorded sectors, a problem where the control cannot be performed, or the like, may be caused.

As long as polarized light, which is a signal caused by a meandering of a track, can normally follow the track, a sufficient amplitude of a wobble signal can be obtained. Thus, it is relatively easy to establish a control system.

Figure 6:
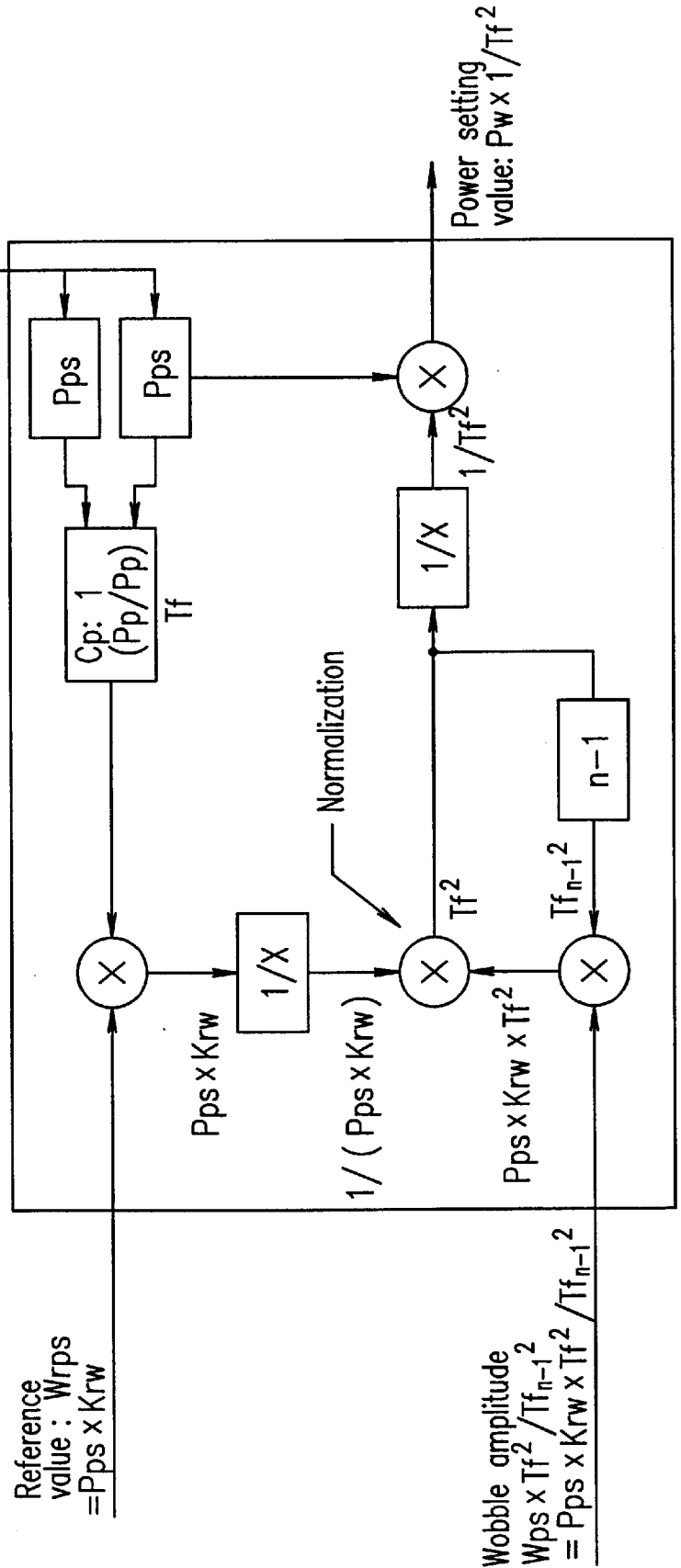
FIG. 6 is a block diagram of an example of another arithmetic unit according to embodiment 2.

An example of a calculation block for performing the above power control calculations for reproduction is shown in FIG. 6. In this structure (details thereof are omitted), when a wobble signal amplitude is smaller than a reference value, a subsequent recording power is calculated while correcting a current emission power. Control for keeping the amplitude of a reproduction signal constant can be achieved based on the above calculations. However, such a control for keeping the amplitude of a reproduction signal constant may produce an excessive emission power on a recording face of a disk. In order to avoid such a problem, it is preferable to perform calculations shown in FIG. 5 even during reproduction so as to keep an effective power on a recording layer constant.

In the apparatus, it is easy to change operation modes between power control for recording and power control for reproduction according to a command received by the CPU 115. Furthermore, it is needless to say that the operation mode can be changed according to the state of the apparatus, a type of a disk with which the apparatus is performing recording/reproduction, the length or time of data to be recorded/reproduced by the apparatus in response to the received command, and the amount of power to be controlled, whereby the reliability of the apparatus can be improved.

Furthermore, in general, when recording/reproduction is performed on a track with a fingerprint or dust attached thereon, a pseudo focus error signal or a pseudo tacking error signal caused by such an attachment may make a control operation of optical means or control means thereof unstable. There is a possible way to prevent such a problem, in which: the transmissivity obtained by calculation based on a detected wobble is monitored; when the value of this transmissivity exceeds a predetermined value, or when the value of this transmissivity exceeds a predetermined value for a predetermined time period, an attachment is detected on a disk surface, and the operation state of the control means is changed, e.g., an operation range of the control means is narrowed, the control state is held, etc. With such a structure, the control performance of the apparatus can be improved.

Figure 7:
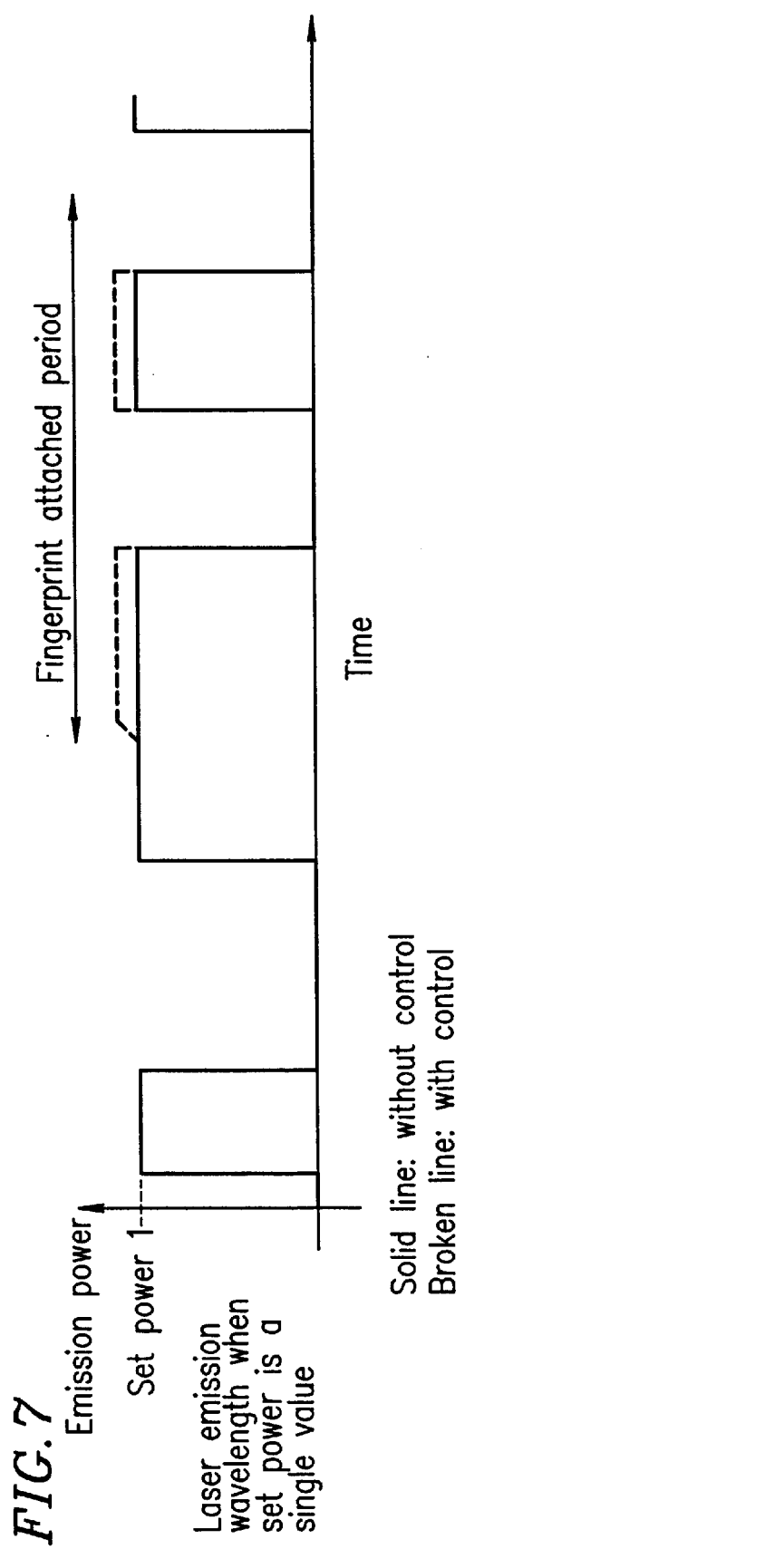
FIG. 7 is a graph showing a laser emission waveform in a case where the set power is a single value according to embodiment 2.
Figure 8:
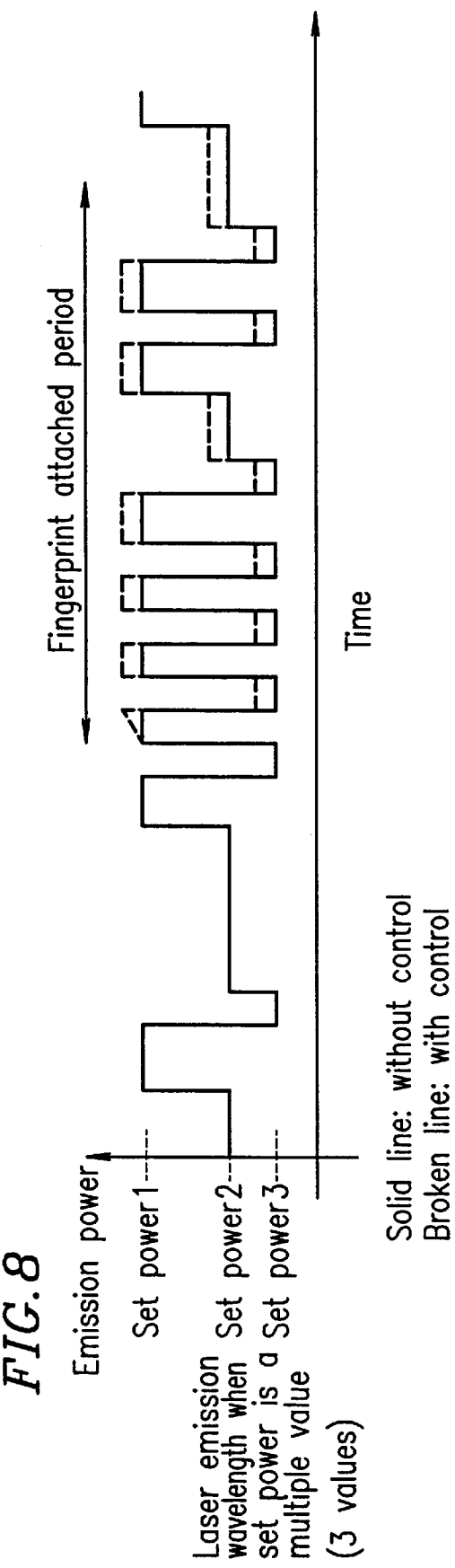
FIG. 8 is a graph showing a laser emission waveform in a case where the set power is a multiple value according to embodiment 2.

FIG. 7 is a graph showing a laser emission waveform in the case where the set power is a single value. FIG. 8 is a graph showing a laser emission waveform in the case where the set power assumes multiple values. As shown in FIGS. 7 and 8, the power control means 111 controls a single-value or multiple-value control power based on a calculation result of the arithmetic unit 118.

Figure 9:
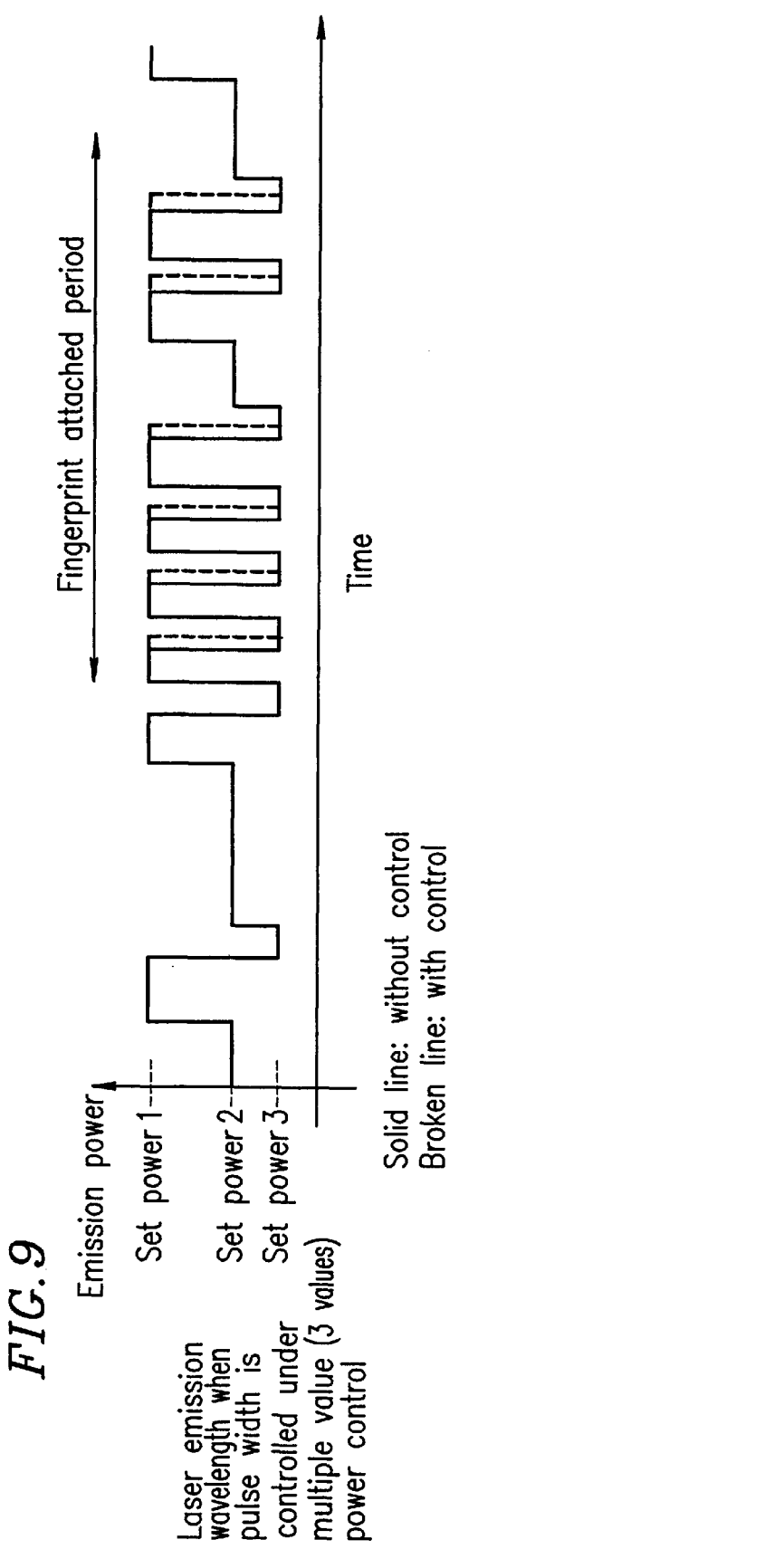
FIG. 9 is a graph showing a laser emission waveform in a case where the pulse width is controlled according to embodiment 2.

FIG. 9 is a graph showing a laser emission waveform in the case where the pulse width is controlled. The power control means 111 controls the duration of a recording pulse during recording as shown in FIG. 9.

Figure 10:
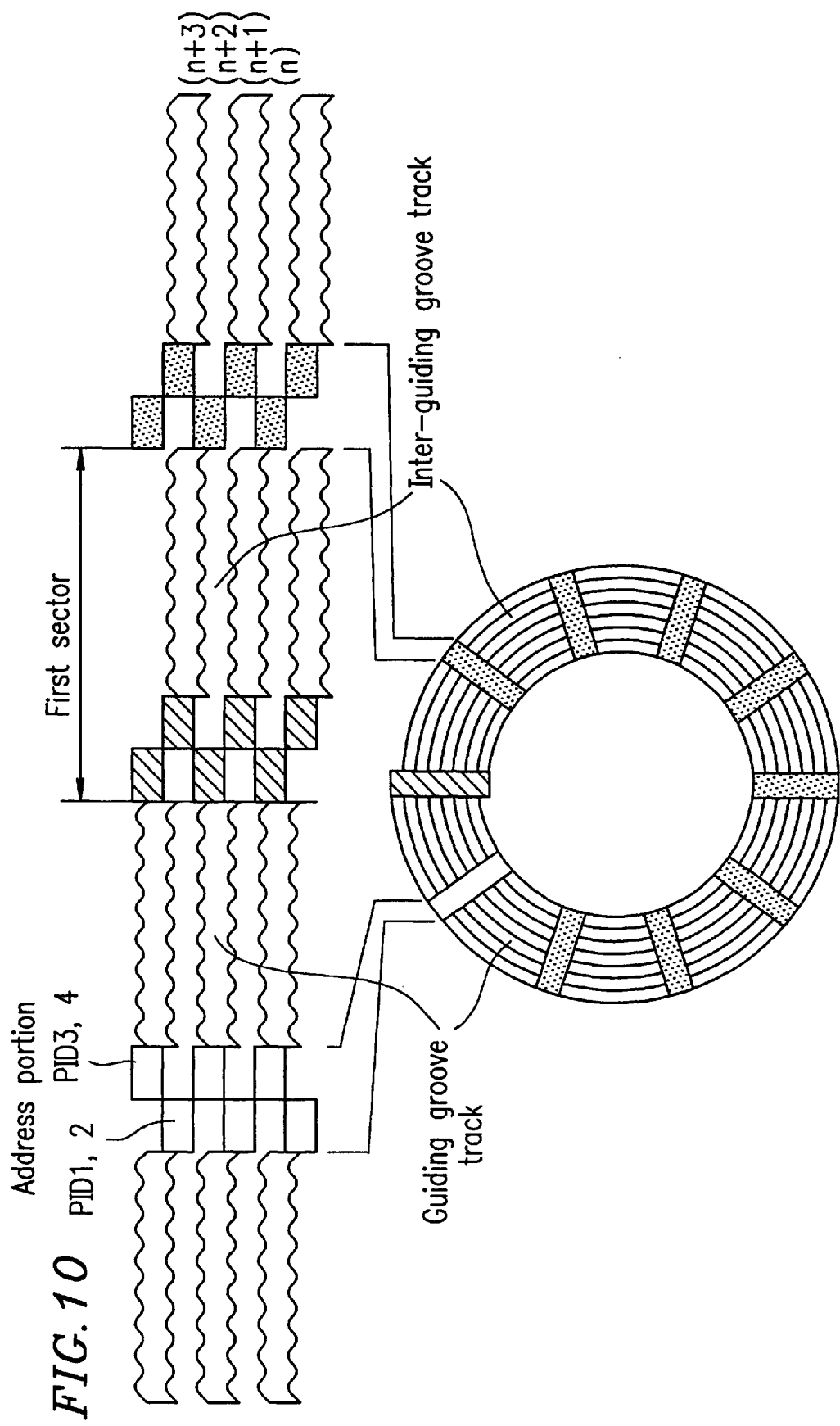
FIG. 10 is a diagram for illustrating recording tracks of a DVD-RAM according to embodiment 2.
Figure 11:
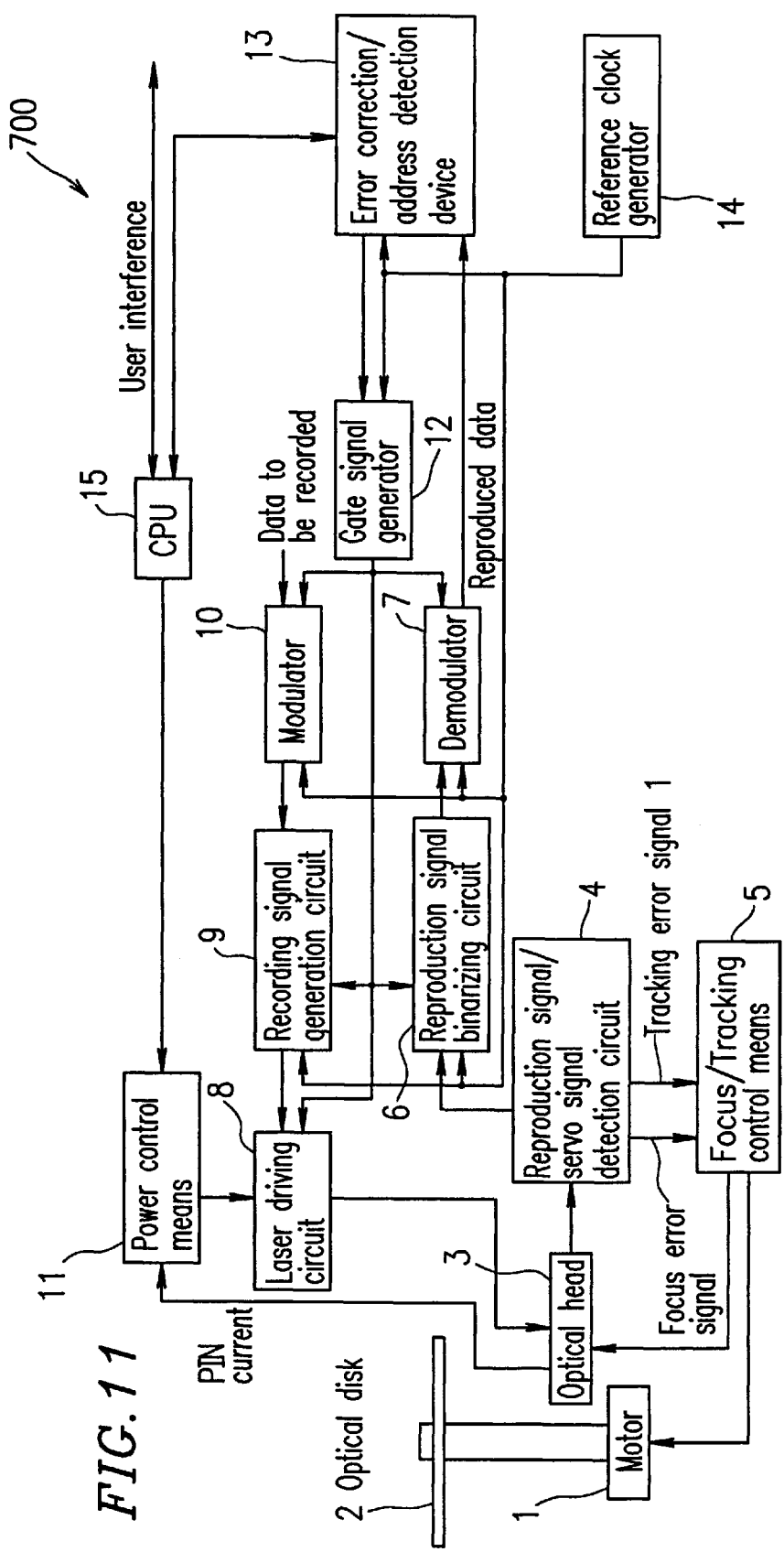
FIG. 11 is a block diagram of a conventional optical disk recording/reproducing device.
Figure 12:
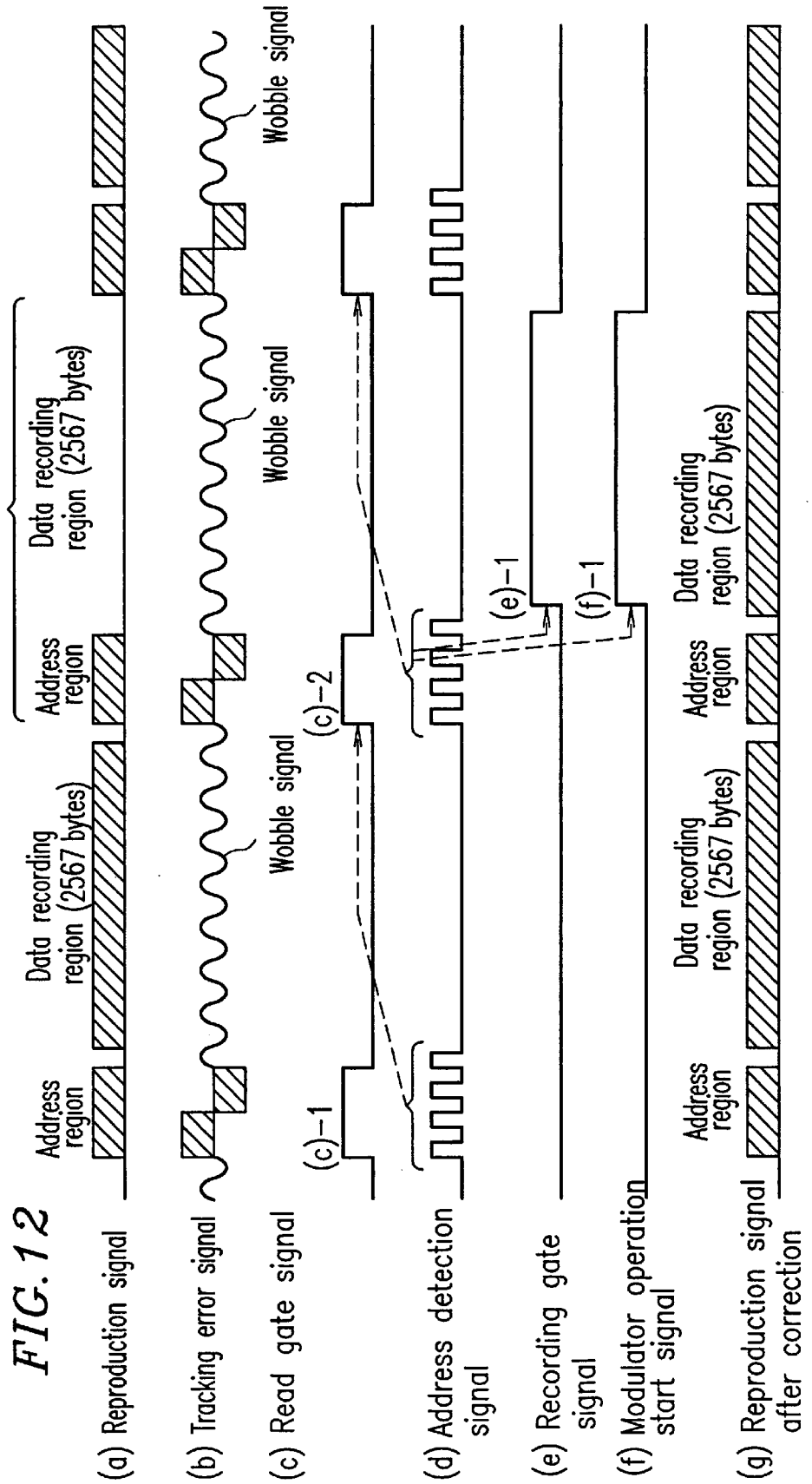
FIG. 12 is a chart for describing an operation of the conventional optical disk recording/reproducing device.
Figure 13:
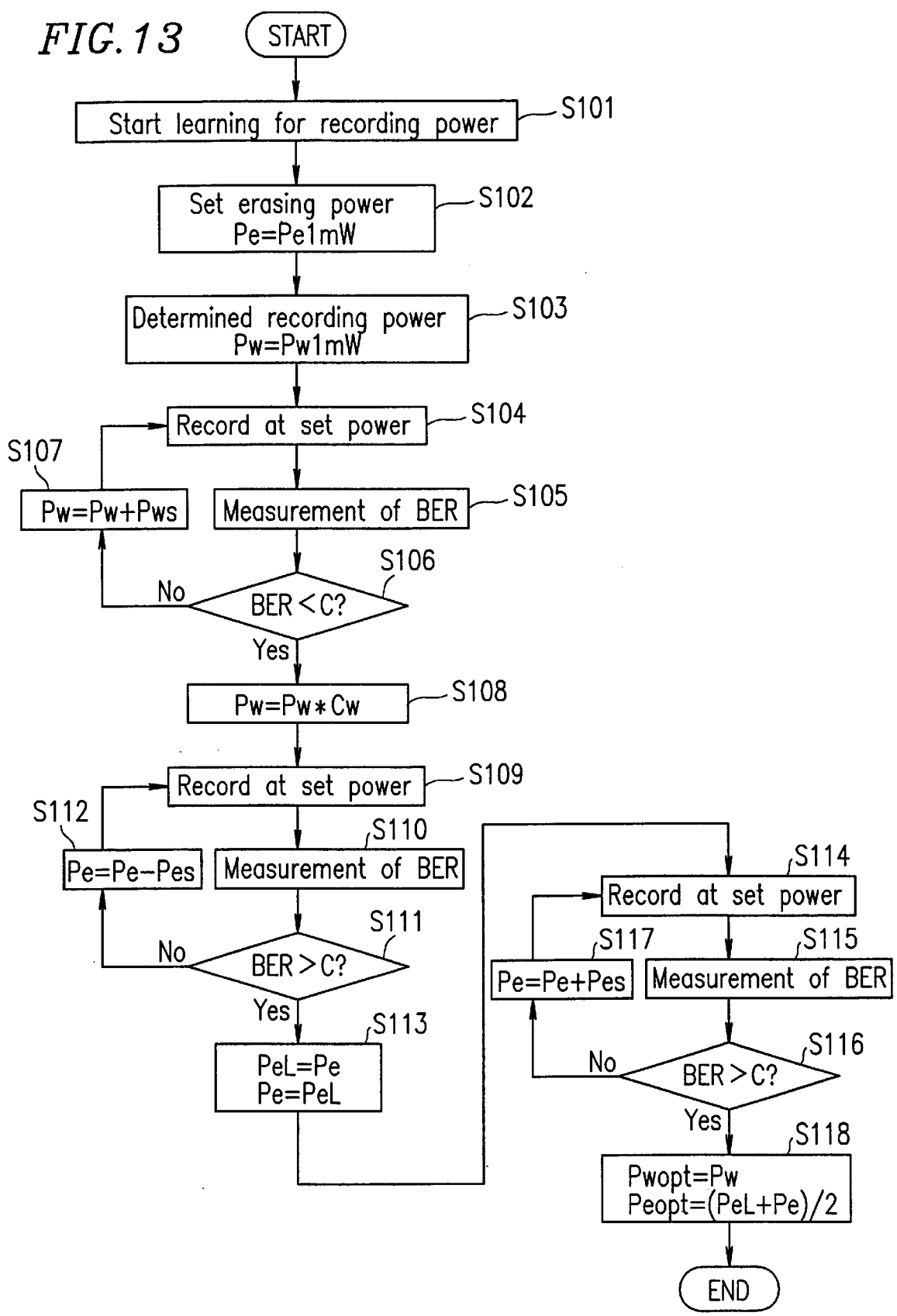
FIG. 13 is a flowchart of a method for determining a suitable recording power of the optical disk recording/reproducing device.

FIG. 10 is a diagram for illustrating recording tracks of a DVD-RAM. As shown in FIG. 10, the optical disk has a guiding groove track and an inter-guiding groove track. An optical disk apparatus can record data in both the guiding groove track and the inter-guiding groove track. The optical disk apparatus includes identification means for identifying whether a track scanned by optical means is a guiding groove track or an inter-guiding groove track. A bias generation circuit generates a bias voltage for recording in a guiding groove track and a bias voltage for recording in an inter-guiding groove track.

INDUSTRIAL APPLICABILITY

As described above, the present invention provides the following effects:

1. A wobble signal amplitude detected during recording of data is compared with a wobble signal amplitude detected during normal recording at an optimum power, the difference therebetween is used for controlling recording power, whereby optimum recording can be performed even when dirt, such as a fingerprint, is present on a disk surface. Furthermore, an effective, optimum recording is possible even when decrease in effective recording power is caused by defocusing, off-tracking, or tilting due to external factors outside the apparatus.

2. In the present invention, when a combination of a disk and an apparatus is previously limited, the amplitude voltage of a wobble signal is controlled to be a target voltage, whereby an optimum recording power can be constantly controlled.

3. Furthermore, in the apparatus of the present invention, it is possible to provide a system which informs about an occurrence of a malfunction. In such a system, during power control based on a wobble signal, when power exceeding a predetermined percentage of an optimum recording power is added to the optimum recording power, a cautionary alarm is provided to a user.

In summary, according to the present invention, even with a disk having a fingerprint, dust, etc., on a face thereof, a desired power for recording/reproduction is calculated from an amount of reflected light, whereby the power can be controlled. Therefore, influence of a fingerprint or dust on performance of the apparatus for recording/reproducing data can be minimized. Moreover, a calculation result exceeding a predetermined threshold is detected, and an abnormality on a disk surface is then detected, whereby operation of optical means and control means thereof can be kept stable.

What is claimed is:

1. An optical disk apparatus for recording or reproduction on an optical disk including a track in which a recording region is wobble-processed, comprising:

optical means for reading information from the optical disk or recording information in the optical disk;

signal generation means for generating a tracking error signal indicating a scanning state of the optical means on the track included in the optical disk by the optical means;

extraction means for extracting a wobble signal from the tracking error signal;

amplitude detection means for detecting a wobble envelope voltage representing an amplitude of the wobble signal based on the wobble signal extracted by the extraction means;

a bias generation circuit for outputting an average value of the wobble envelope voltage as a bias voltage;

an arithmetic unit for calculating a positive square root of the wobble envelope voltage with respect to the bias voltage assumed as being "1", and outputting a reciprocal of the calculated positive square root as a calculation result; and recording power control means for controlling recording power when the optical means records the information in the optical disk, based on the calculation result.

2. An optical disk apparatus according to claim 1, wherein:

the optical disk apparatus is capable of recording data in a guiding groove portion and an inter-guiding groove portion of the optical disk;

the optical disk apparatus further comprises identification means for identifying whether a track scanned by the optical means is in the guiding groove portion or the inter-guiding groove portion; and the bias generation circuit generates two types of bias voltages, a bias voltage for recording in the guiding groove portion and a bias voltage for recording in the inter-guiding groove portion, based on an identification result by the identification means.

3. An optical disk apparatus according to claim 1, wherein the arithmetic unit calculates a positive square root of the wobble envelope voltage with respect to the bias voltage assumed as being "1", and provides a value obtained by adding "1" to a result of subtraction of the positive square root from "1" as a calculation result.

* * * * *